(12) United States Patent
Jahns et al.

(10) Patent No.: US 11,575,329 B1
(45) Date of Patent: Feb. 7, 2023

(54) BALANCED CURRENT-SOURCE INVERTER

(71) Applicant: Wisconsin Alumni Research Foundation, Madison, WI (US)

(72) Inventors: Thomas Merlin Jahns, Madison, WI (US); Hang Dai, Madison, WI (US); Bulent Sarlioglu, Madison, WI (US); Renato Amorim Torres, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/463,676

(22) Filed: Sep. 1, 2021

(51) Int. Cl.
*H02M 7/521* (2006.01)
*H02P 27/06* (2006.01)
*H02M 7/523* (2006.01)

(52) U.S. Cl.
CPC ............ *H02M 7/521* (2013.01); *H02M 7/523* (2013.01); *H02P 27/06* (2013.01)

(58) Field of Classification Search
CPC ...... H02M 7/521; H02M 7/523; H02M 7/525; H02M 7/527; H02M 7/53; H02M 7/537; H02P 27/04; H02P 27/08; H02P 27/085; H02P 27/10
See application file for complete search history.

(56) References Cited

U.S. PATENT DOCUMENTS

| 8,130,524 | B2 | 3/2012 | Lee et al. | |
|---|---|---|---|---|
| 9,577,530 | B1 | 2/2017 | Ribarich et al. | |
| 9,917,543 | B1* | 3/2018 | Sarlioglu | H02P 25/22 |
| 2007/0133235 | A1* | 6/2007 | Kurosawa | H02J 3/1807 363/50 |
| 2010/0067264 | A1 | 3/2010 | Ohashi et al. | |
| 2012/0155135 | A1* | 6/2012 | Fujii | H02M 7/487 363/98 |
| 2012/0218801 | A1* | 8/2012 | Yamanaka | H03K 7/08 363/148 |
| 2013/0003418 | A1* | 1/2013 | Motegi | H02M 7/53875 363/13 |

(Continued)

OTHER PUBLICATIONS

Dai et al., Development of High-Frequency WBG Power Modules with Reverse-Voltage-Blocking Capability for an Integrated Motor Drive using a Current-Source Inverter, 2018 IEEE Energy Convers. Congr. Expo, p. in press, 2018.

(Continued)

*Primary Examiner* — Alex Torres-Rivera
(74) *Attorney, Agent, or Firm* — Bell & Manning, LLC

(57) ABSTRACT

A switching circuit for a current source inverter includes a first inverter leg, a second inverter leg, and a controller. The first inverter leg includes a first reverse-voltage-blocking (RB) switch, a second RB switch, and a third RB switch that are connected in series between a first bus line and a second bus line. The second inverter leg includes a fourth RB switch, a fifth RB switch, and a sixth RB switch are connected in series between the first bus line and the second bus line. The controller is configured to control a switch between an on-state and an off-state for each RB switch. When in the on-state, a reverse voltage is blocked by a respective RB switch, and a current with a positive polarity is conducted through the respective RB switch. When in the off-state, a voltage and the current are blocked by the respective RB switch.

20 Claims, 26 Drawing Sheets
(4 of 26 Drawing Sheet(s) Filed in Color)

(56) References Cited

U.S. PATENT DOCUMENTS

| | | | |
|---|---|---|---|
| 2013/0229843 A1* | 9/2013 | Takatsuka | H02M 1/44 363/97 |
| 2015/0097507 A1 | 4/2015 | Kim et al. | |
| 2015/0146462 A1* | 5/2015 | Yamanaka | H02M 7/5395 363/97 |
| 2018/0222333 A1 | 8/2018 | Khaligh | |
| 2020/0295673 A1 | 9/2020 | Dai et al. | |
| 2021/0341544 A1* | 11/2021 | Vovos | H02H 3/347 |
| 2022/0286072 A1* | 9/2022 | Gopalakrishnan | H02P 27/08 |

OTHER PUBLICATIONS

J. W. Wu et al., "1200V, 25A bi-directional Si DMOS IGBT fabricated with fusion wafer bonding," *Proc. Int. Symp. Power Semicond. DevicesICs*, pp. 95-98, 2014.

M. Baus et al., "Fabrication of Monolithic Bidirectional Switch (MBS) devices with MOS-controlled emitter structures," *Power Semicond.Devices IC's, 2006 IEEE Int. Symp.*, pp. 1-4, 2006.

S. Chowdhury, C. W. Hitchcock, Z. Stum, R. P. Dahal, I. B. Bhat, and T. P. Chow, "Operating Principles, Design Considerations, and Experimental Characteristics of High-Voltage 4H-SIC Bidirectional IGBTs," *IEEE Trans. Electron Devices*, vol. 64, No. 3, pp. 888-896, 2017.

Umeda et al., "High Power 3-phase to 3-phase Matrix Converter Using Dual-gate GaN Bidirectional Switches," in *2018 IEEE Applied Power Electronics Conference and Exposition (APEC)*, 2018, pp. 894-897.

T. Morita et al., "650 V 3.1 mΩcm2 GaN-based monolithic bidirectional switch using normally-offgate injection transistor," in *2007 IEEE International Electron Devices Meeting*, 2007, pp. 865-868.

Lasserre al, "Integrated Bi-directional Sic MOSFET power switches for efficient, power dense and reliable matrix converter assembly," *WiPDA 2016—4th IEEE Work. Wide Bandgap Power Devices Appl.*, pp. 188-193, 2016.

P. Wheeler and D. Grant, "Optimised input filter design and low-loss switching techniques for a practical matrix converter," *IEE Proc.-Electr. Power Appl.*, vol. 144, No. 1, p. 53, 1997.

Hornkamp, et al., "Economac the First All-In-One IGBT Module for Matrix Converters," 2001, p. 640.

Lorenzani, et al., "CSI7: A Modified Three-Phase Current-Source Inverter for Modular Photovoltaic Applications," *IEEE Trans. Ind. Electron.*, vol. 64, No. 7, pp. 5449-5459, 2017.

W. Wang, F. Gao, Y. Yang, and F. Blaabjerg, "Operation and modulation of H7 current-source inverter with hybrid SiC and Si semiconductor switches," *IEEE J. Emerg. Sel. Top. Power Electron.*, vol. 6, No. 1, pp. 387-399, 2018.

B. Wu, High-Power Converters and AC Drives. H. 10, Wiley 2006.

Dai et al., "An H7 Current-Source Inverter using Wide Bandgap Bidirectional Switches to Achieve High Efficiency and Low Conducted Common-Mode EMI," Conference Paper 2020, Researchgate.

Dai et al., "Common-Mode EMI Examination of Three-phase Voltage-Source and Current-Source Converters Systems using WBG Devices," Conference Paper Oct. 2020, Researchgate.

Han et al., "Common-Mode Voltage Cancellation in PWM Motor Drives with Balanced Inverter Topology," *IEEE Transactions on Industrial Electronics*, vol. 64, No. 4, Apr. 2017, pp. 2683-2388.

Morya et al., "Wide Bandgap Devices in AC Electric Drives: Opportunities and Challenges," *IEEE Transactions on Transportation Electrification*, Mar. 2019.

Wang et al., "Modulation Schemes for Balanced Inverter under Single Upper/Lower Switch Fault Conditions," *2020 IEEE Energy Conversion Congress and Exposition (ECCE)*, 2020, pp. 3057-3064.

\* cited by examiner

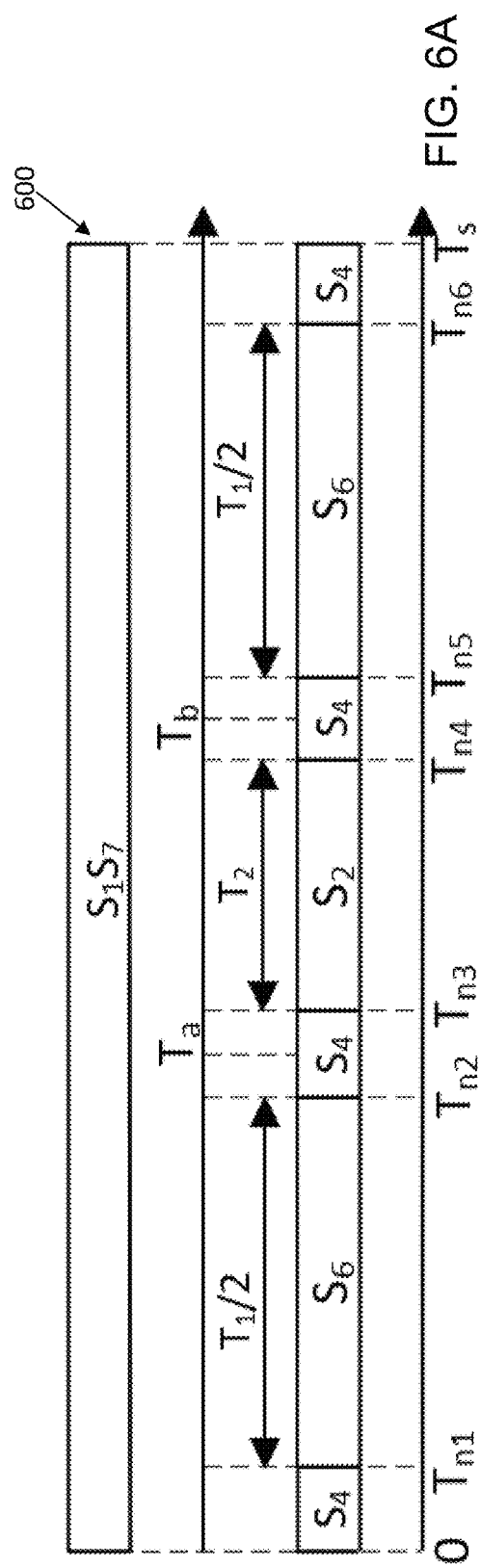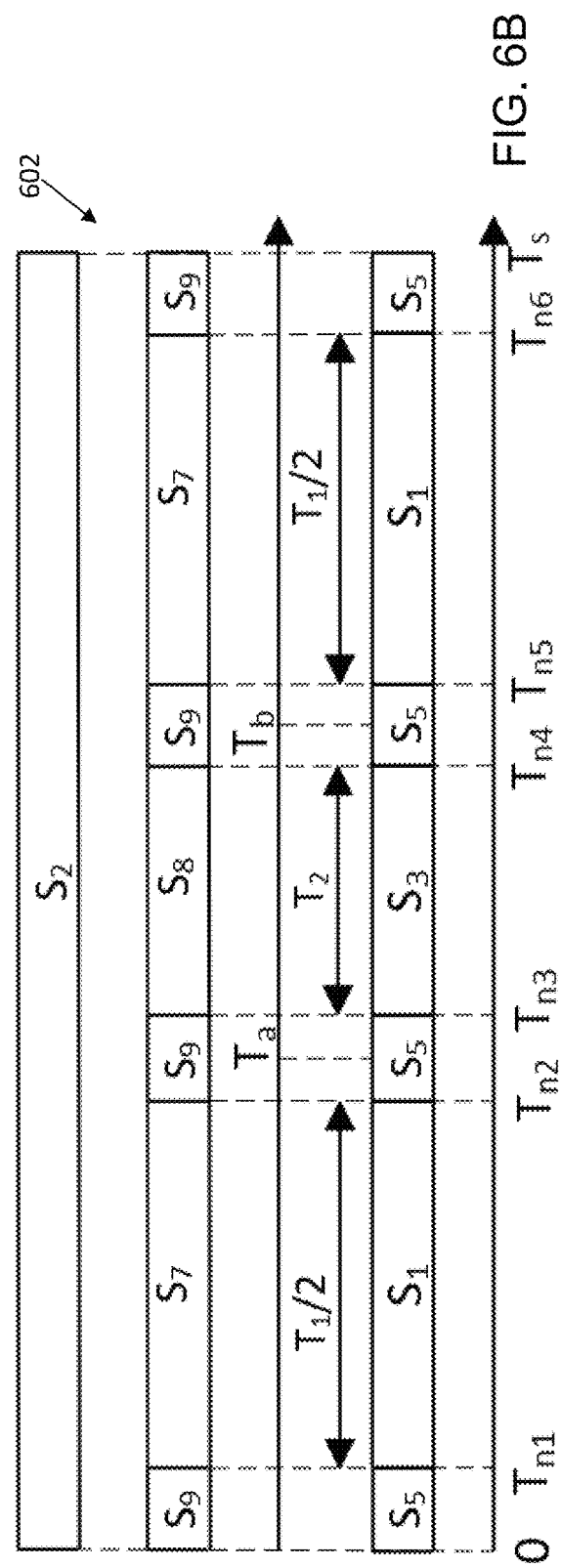

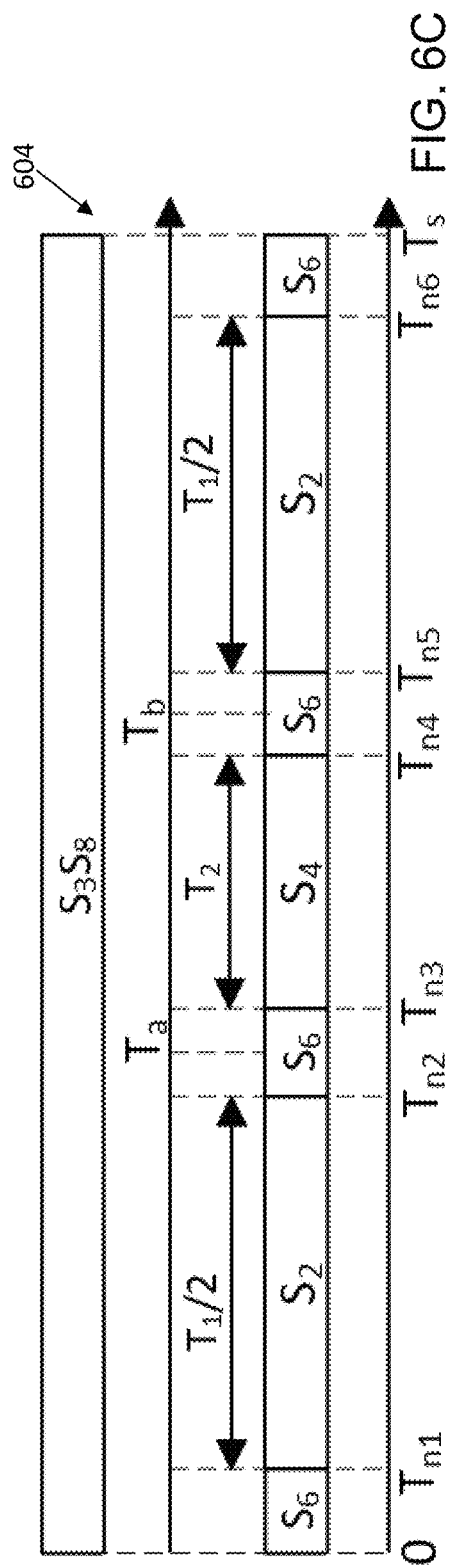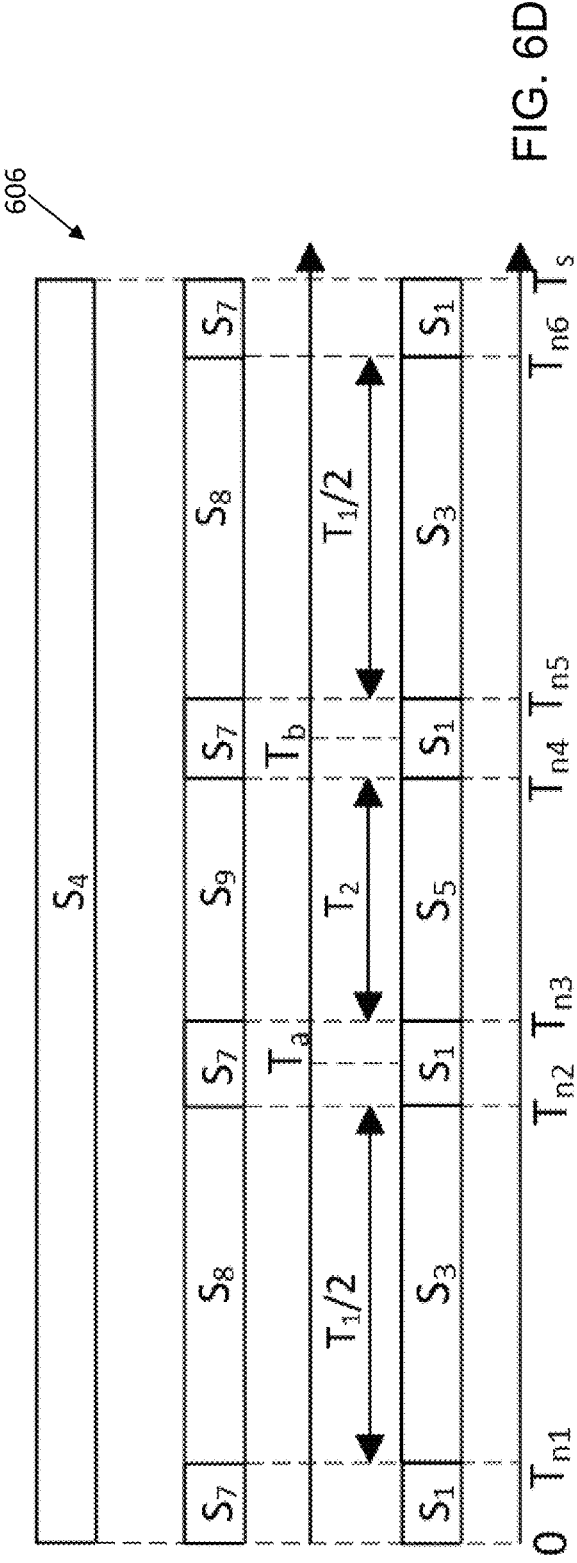

BALANCED CURRENT-SOURCE INVERTER

REFERENCE TO GOVERNMENT RIGHTS

This invention was made with government support under DE-AR0000893 awarded by the DOE/ARPA-E. The government has certain rights in the invention.

BACKGROUND

Current-source inverters (CSIs) using reverse-voltage-blocking (RB) switches were dominant in the early days of power electronics and are still used in some megawatt (MW)-level motor drive applications. Due to the latching characteristics of thyristors and low switching frequency capability of thyristor-based devices like gate turn-off thyristors, such CSI systems are usually very bulky. CSIs based on non-latching reverse-voltage-blocking (RB) devices can increase the CSI's switching frequency, but the high conduction loss of available silicon (Si)-based RB switches and their limited availability have prevented CSIs using RB switches from competing with voltage-source inverters (VSIs). The non-latching silicon switches developed since the 1980s including metal-oxide-semiconductor field-effect transistors (MOSFETs) and insulated-gate bipolar transistors (IGBTs) can switch at frequencies in the tens of kilohertz (kHz) and are naturally suitable for voltage-source inverter (VSI) topologies. However, the lack of RB capability in such devices usually requires them to be in series connection with a diode to achieve RB capability, which increases the CSI's conduction loss significantly compared to the VSI which can use the switch without the series diode.

Despite the VSIs' present dominance in commercial products, VSIs in motor drive applications result in a number of undesirable features including low reliability due to use of electrolytic direct current (DC)-link capacitors, detrimental common-mode electromagnetic interference (CM EMI), significant cable overvoltage, increased motor loss, etc. The sinusoidal output voltage and current waveforms and the use of DC-link inductors by CSIs can naturally overcome many of these VSI disadvantages at the same time.

The conventional H6-CSI topology, despite its lower CM EMI as compared to VSI, still requires external filters to suppress the EMI in order to comply with EMI standards.

SUMMARY

In an example embodiment, a switching circuit for a current source inverter is provided that includes, but is not limited to, a first inverter leg, a second inverter leg, and a controller. The first inverter leg includes a first reverse-voltage-blocking (RB) switch, a second RB switch, and a third RB switch that are connected in series between a first bus line and a second bus line. The second inverter leg includes a fourth RB switch, a fifth RB switch, and a sixth RB switch that are connected in series between the first bus line and the second bus line. The controller is configured to control a switch between an on-state and an off-state for each RB switch. When in the on-state, a reverse voltage is blocked by a respective RB switch, and a current with a positive polarity is conducted through the respective RB switch. When in the off-state, a voltage and the current are blocked by the respective RB switch.

In another example embodiment, a current source inverter is provided. The current source inverter includes, but is not limited to, an inductor, a filter, and the switching circuit connected between the inductor and the filter.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 6A-6F are control signal time period snapshots for the current source inverter of FIG. 1 when providing power to an AC load in accordance with an illustrative embodiment.

DETAILED DESCRIPTION

Figure 1:
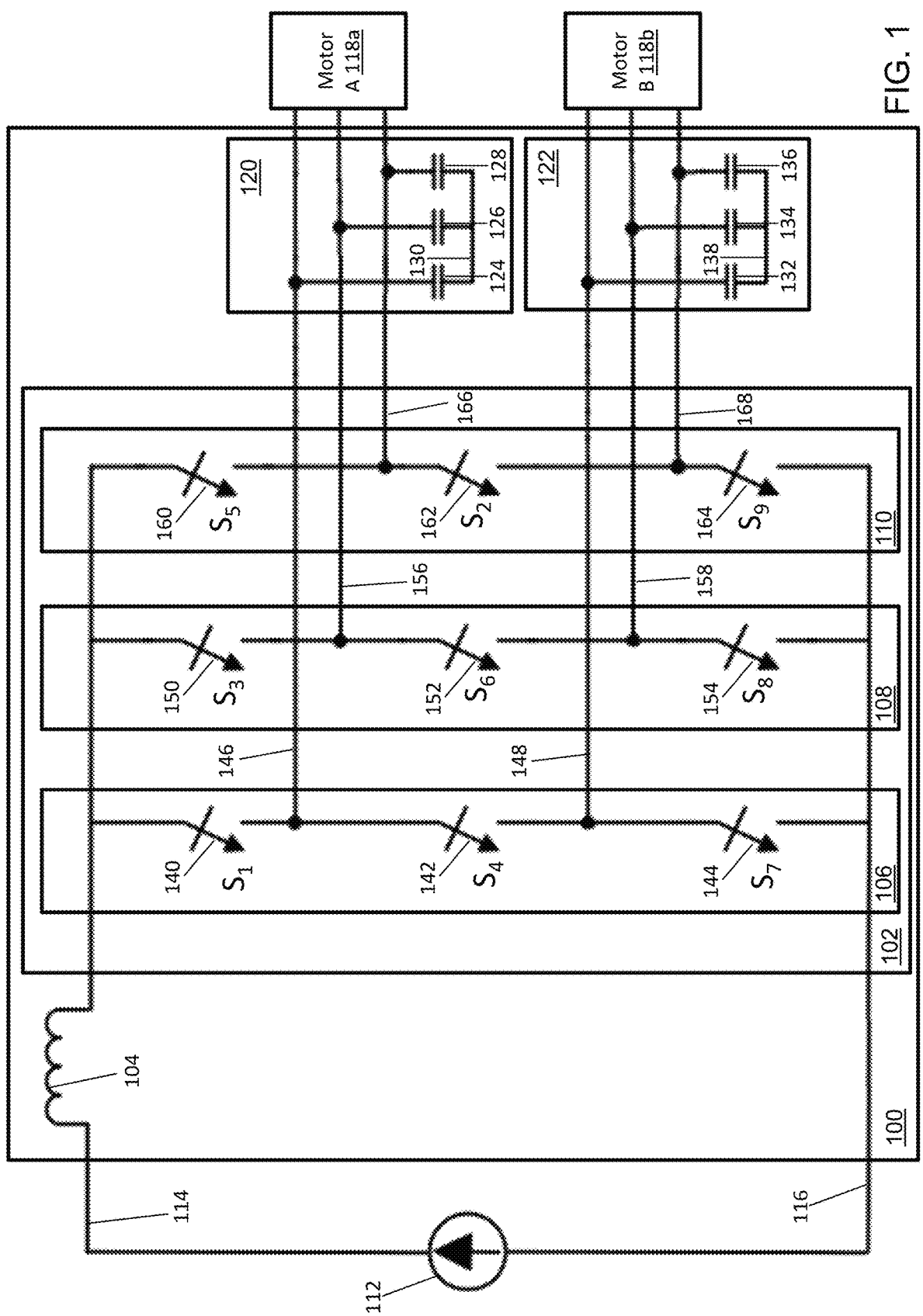
FIG. 1 is a circuit diagram of a balanced current source inverter in accordance with an illustrative embodiment.

Referring to FIG. 1, a first current source inverter (CSI) 100 is shown in accordance with an illustrative embodiment. First CSI 100 may include an inverter switching circuit 102, an inductor 104, a first capacitive filter 120, and a second capacitive filter 122. Inverter switching circuit 102 is connected between inductor 104 and both first capacitive filter 120 and second capacitive filter 122. First CSI 100 is connected between a direct current (DC) source 112 and an alternating current (AC) load 404 (shown referring to FIG. 4) such as a motor A 118a and a motor B 118b. First CSI 100 converts the DC current from DC source 112 to an AC voltage and current provided to AC load 404.

First CSI 100 is connected between a first bus line 114 and a second bus line 116. In the illustrative embodiment of FIG. 1, inductor 104 is connected on first bus line 114 in series between DC source 112 and switching circuit 102. Inductor 104 may be one or more inductors connected in series of various types with various inductance values. Though not shown, inductor 104 further may include one or more inductors connected in series between DC source 112 and switching circuit 102 on second bus line 116. As understood by a person of skill in the art, an inductor is a passive two-terminal electrical component that stores energy in a magnetic field when electric current flows through it. An inductance value for inductor 104 may be selected to carry a load current based on an application area of first CSI 100 as understood by a person of skill in the art. First bus line 114 and second bus line 116 provide connections to inverter switching circuit 102 from DC source 112 through inductor 104. Inverter switching circuit 102 is connected on a side of inductor 104 opposite the connection of inductor 104 with DC source 112.

Inverter switching circuit 102 may include a first inverter leg 106, a second inverter leg 108, and a third inverter leg 110. First capacitive filter 120 may include a first capacitor 124, a second capacitor 126, and a third capacitor 128, one capacitor for each phase of the AC voltage and current provided to, for example, motor A 118a. A capacitor of first capacitor 124, second capacitor 126, and third capacitor 128 is associated with each inverter leg of first inverter leg 106, second inverter leg 108, and third inverter leg 110, respectively.

Second capacitive filter 122 may include a fourth capacitor 132, a fifth capacitor 134, and a sixth capacitor 128, one capacitor for each phase of the AC voltage and current provided to, for example, motor B 118b. A capacitor of fourth capacitor 132, fifth capacitor 134, and sixth capacitor 128 is associated with each inverter leg of first inverter leg 106, second inverter leg 108, and third inverter leg 110, respectively.

First capacitor 124 is connected between a first, A phase line 146 of first inverter leg 106 and a first filter line 130. Fourth capacitor 132 is connected between a second, A phase line 148 of first inverter leg 106 and a second filter line 138. Second capacitor 126 is connected between a first, B phase line 156 of second inverter leg 108 and first filter line 130. Fifth capacitor 134 is connected between a second, B phase line 158 of second inverter leg 108 and second filter line 138. Third capacitor 128 is connected between a first, C phase line 166 of third inverter leg 110 and first filter line 130. Sixth capacitor 136 is connected between a second, C phase line 168 of third inverter leg 110 and second filter line 138.

Each capacitor of first capacitive filter 120 and of second capacitive filter 122 may be a capacitor of various types and with various ratings. As understood by a person of skill in the art, a capacitor is a passive two-terminal electrical component that stores electrical energy in an electric field and has an associated rated capacitance value. A rating of each capacitor of first capacitive filter 120 and of second capacitive filter 122 may be selected to carry inductive current from AC load 404 without requiring the switches of first inverter leg 106, second inverter leg 108, and third inverter leg 110 to provide a current flow-path. In alternative embodiments, other types of filters may be used based on AC load 404.

First inverter leg 106 may include a first switch 140, a second switch 142, and a third switch 144 connected in series between first bus line 114 and second bus line 116 opposite inductor 104 relative to DC source 112. Second inverter leg 108 may include a fourth switch 150, a fifth switch 152, and a sixth switch 154 connected in series between first bus line 114 and second bus line 116 opposite inductor 104 relative to DC source 112. Third inverter leg 110 may include a seventh switch 160, an eighth switch 162, and a ninth switch 164 connected in series between first bus line 114 and second bus line 116 opposite inductor 104 relative to DC source 112.

First, A phase line 146 is connected between first switch 140 and second switch 142 and to AC load 404, such as motor A 118a, through first capacitive filter 120. Second, A phase line 148 is connected between second switch 142 and third switch 144 and to AC load 404, such as motor B 118b, through second capacitive filter 122. First, B phase line 156 is connected between fourth switch 150 and fifth switch 152 and to AC load 404, such as motor A 118a, through first capacitive filter 120. Second, B phase line 158 is connected between fifth switch 152 and sixth switch 154 and to AC load 404, such as motor B 118b, through second capacitive filter 122. First, C phase line 166 is connected between seventh switch 160 and eighth switch 162 and to AC load 404, such as motor A 118a, through first capacitive filter 120. Second, C phase line 168 is connected between eighth switch 162 and ninth switch 164 and to AC load 404, such as motor B 118b, through second capacitive filter 122.

Figure 2:
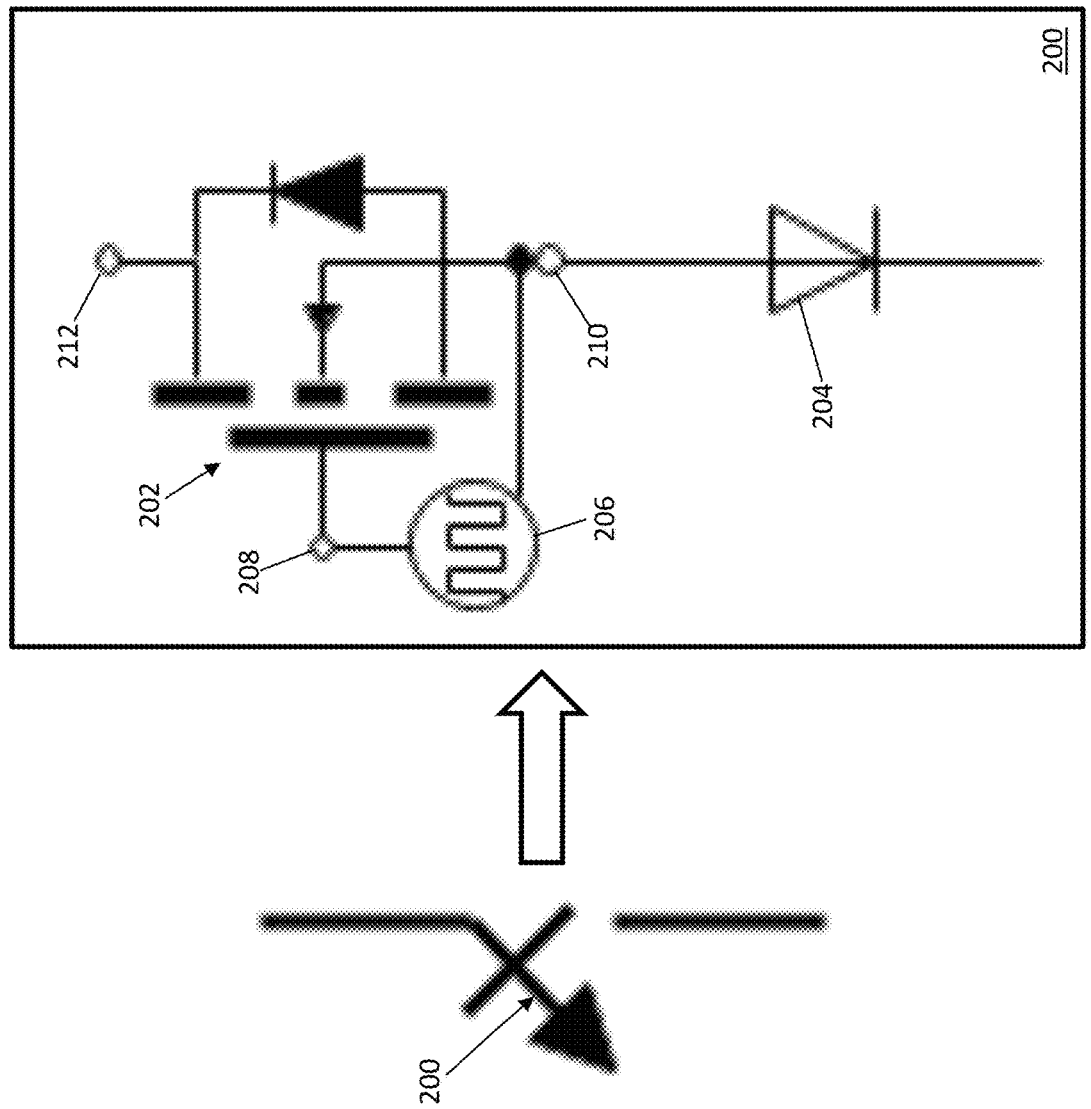
FIG. 2 is a circuit diagram of a switch that can be included in the current source inverter of FIG. 1 in accordance with an illustrative embodiment.

Each switch of first inverter leg 106, second inverter leg 108, and third inverter leg 110 is a reverse-voltage-blocking (RB) switch. Referring to FIG. 2, an RB switch 200 is shown in accordance with an illustrative embodiment. RB switch 200 is merely an illustrative RB switch that may be used. Alternative RB switches are described in H. Dai, T. M. Jahns, R. A. Torres, M. Liu, B. Sarlioglu, and S. Chang, "Development of High-Frequency WBG Power Modules with Reverse-Voltage-Blocking Capability for an Integrated Motor Drive using a Current-Source Inverter," 2018 IEEE Energy Convers. Congr. Expo, pp. 1808-1815, 2018; P. Wheeler and D. Grant, "Optimised input filter design and low-loss switching techniques for a practical matrix converter," IEE Proc.—Electr. Power Appl., vol. 144, no. 1, p. 53, 1997; and M. Hornkamp, M. Loddenkotter, M. Munzer, O. Simon, and M. Bruckmann, "ECONOMAC THE FIRST ALL-IN-ONE IGBT MODULE FOR MATRIX CONVERTERS," 2001, p. 640.

RB switch 200 may be a semiconductor switch formed of one or more of various types of semiconductors such as a MOSFET, a high electron mobility transistor (HEMT), etc. Referring to FIG. 2, RB switch 200 may include a transistor 202 and a diode 204. Transistor 202 may include a gate terminal 208, a source terminal 210, and a drain terminal 212. For illustration, transistor 202 may be an n-channel, enhancement mode silicon-carbide (SiC)-MOSFET. As understood by a person of skill in the art, the terminals of different types of semiconductor devices may be labeled differently based on the type of switch. For example, for a MOSFET or an HEMT, a first terminal, a second terminal, and a third terminal may be referred to as a drain, a gate, and a source, respectively. A voltage applied to the second terminal determines a switching state of the semiconductor device, as in an on-state or as in an off-state. In the off-state, there is little or no conduction between drain terminal 212 and source terminal 210. In the on-state, there is current flow from drain terminal 212 to source terminal 210.

Gate terminal 208 and source terminal 210 may be connected to a pulse width modulated (PWM) signal generator 206 of controller 402. Source terminal 210 may be connected to the anode of diode 204. Gate terminal 208 and source terminal 210 may be connected to switch together under control of PWM signal generator 206. RB switch 200 may be in an off-state when an off-state control signal is provided by PWM signal generator 206 of controller 402 to gate terminal 208. RB switch 200 may be in an on-state when an on-state control signal is provided by PWM signal generator 206 of controller 402 to gate terminal 208 and source terminal 210.

Diode 204 may be a diode of various types such as a p-n junction type, a Schottky barrier type, etc. with various ratings. As understood by a person of skill in the art, a diode is a two-terminal electrical component that conducts current primarily in one direction from an anode to a cathode. Diode 204 is connected in series to source terminal 210 of transistor 202 with the anode of diode 204 connected to receive current from transistor 202.

First CSI 100 converts an input DC current from DC source 112 on first bus line 114 to a three-phase current output signal with a first phase current signal output on first, A phase line 146 and on second, A phase line 148, with a second phase current signal output on first, B phase line 156 and on second, B phase line 158, and with a third phase current signal output on first, C phase line 166 and on second, C phase line 168. In an illustrative embodiment, the first phase current signal output on first, A phase line 146 is shifted 180 degrees relative to the first phase current signal output on second, A phase line 148; the second phase current signal output on first, B phase line 156 is shifted 180 degrees relative to the second phase current signal output on second, B phase line 158; and the third phase current signal output on first, C phase line 166 is shifted 180 degrees relative to the third phase current signal output on second, C phase line 168.

First capacitive filter 120 may be configured to reduce voltage spikes on a voltage output to the AC load 404, such as motor A 118a, by reducing a rate of rise and fall of the first phase current signal, the second phase current signal, and the third phase current signal on first, A phase line 146, first, B phase line 156, and first, C phase line 166, respectively. First, A phase line 146, first, B phase line 156, and first, C phase line 166 may be connected to provide the three-phase current output signal to AC load 404, such as motor A 118a.

Second capacitive filter 122 may be configured to reduce voltage spikes on a voltage output to the AC load 404, such as motor B 118b, by reducing a rate of rise and fall of the first phase current signal, the second phase current signal, and the third phase current signal on second, A phase line 148, second, B phase line 158, and second, C phase line 168, respectively. Second, A phase line 148, second, B phase line 158, and second, C phase line 168 may be connected to provide the three-phase current output signal to AC load 404, such as motor B 118b.

Figure 3:
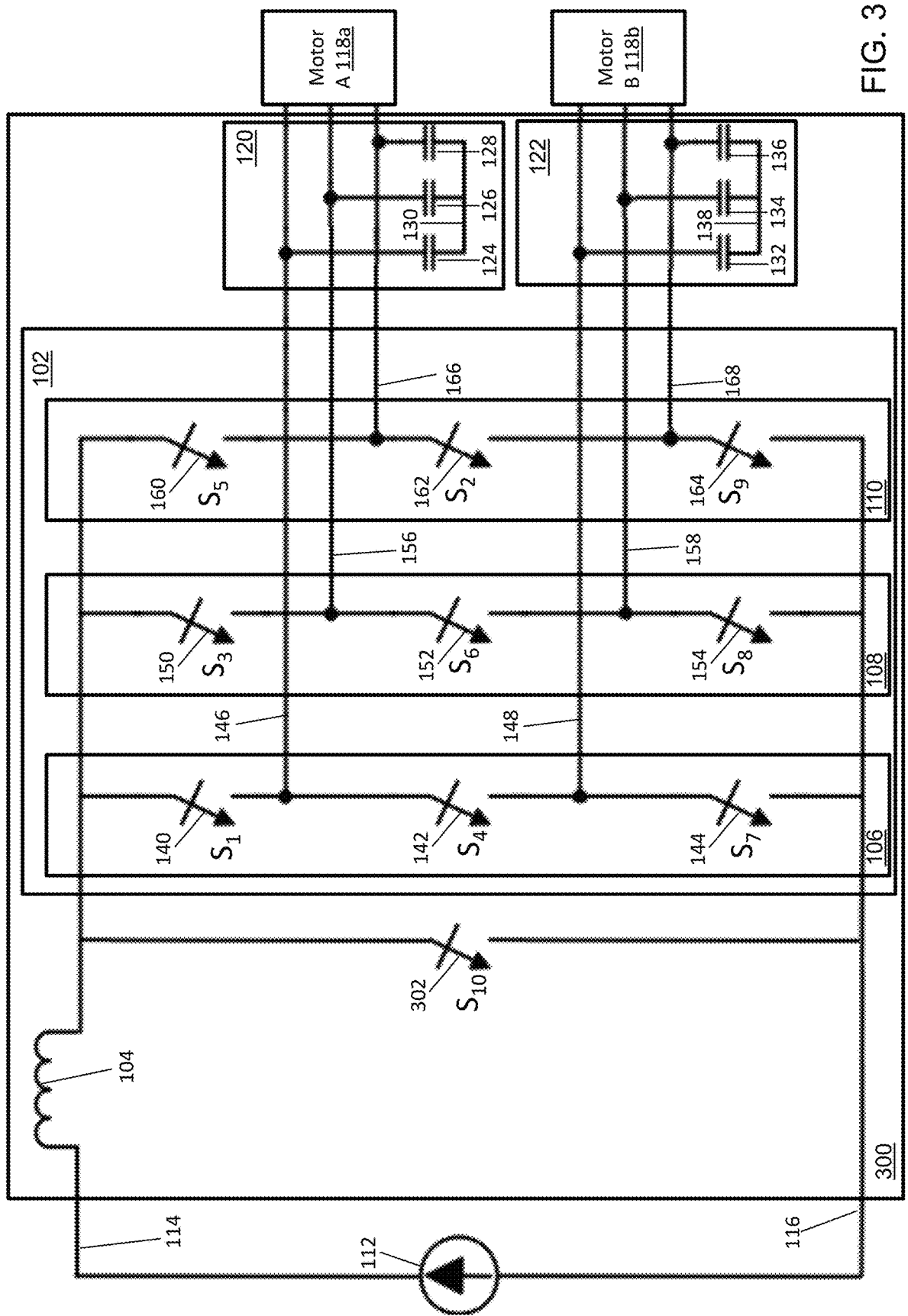
FIG. 3 is a circuit diagram of a balanced current source inverter in accordance with another illustrative embodiment.

Referring to FIG. 3, a second CSI 300 is shown in accordance with an illustrative embodiment. Second CSI 300 may include inverter switching circuit 102, a tenth RB switch 302, inductor 104, first capacitive filter 120, and second capacitive filter 122. Tenth RB switch 302 is connected between inductor 104 and inverter switching circuit 102 in parallel with inverter switching circuit 102 between first bus line 114 and second bus line 116. Tenth RB switch 302 is connected on a side of inductor 104 opposite the connection with DC source 112.

Figure 4:
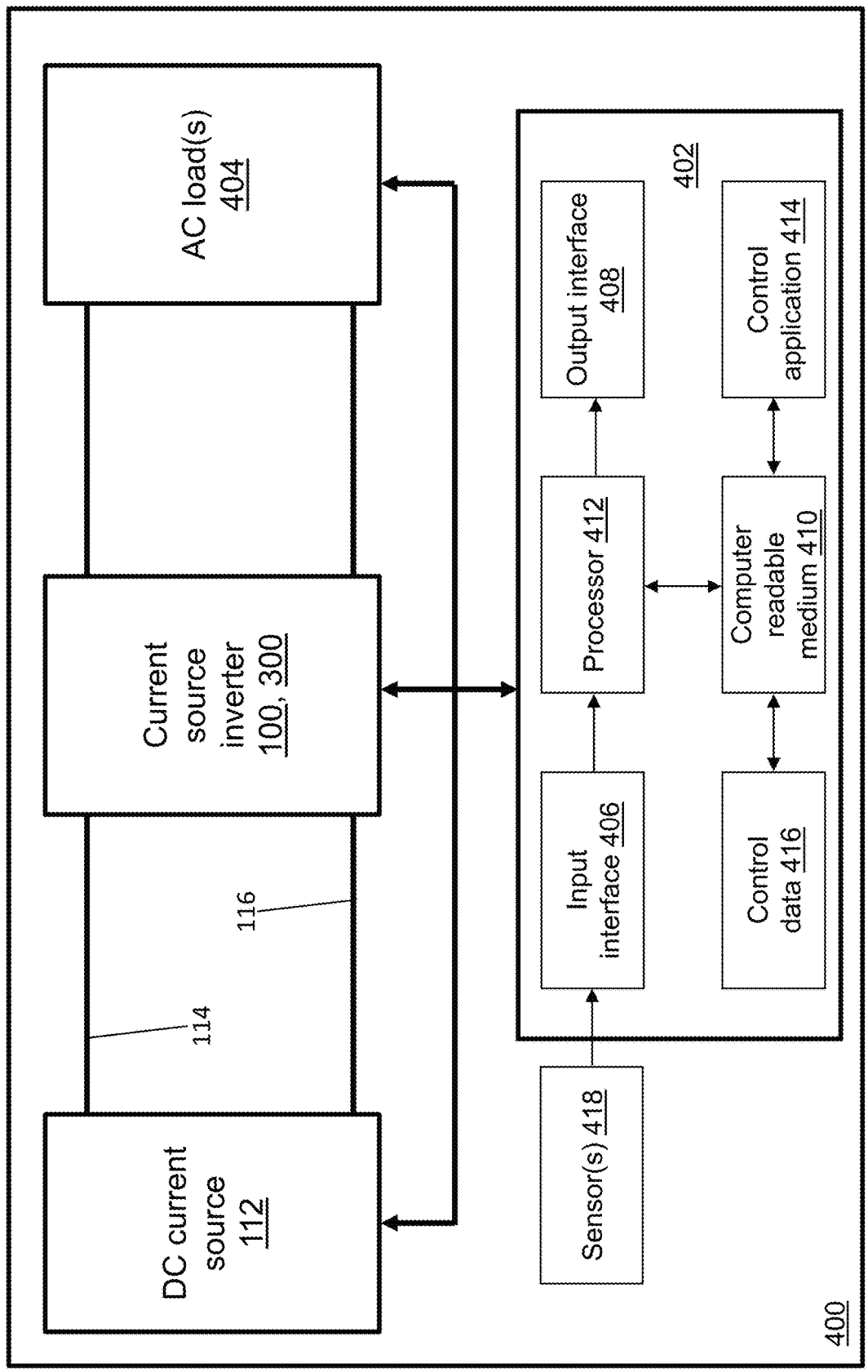
FIG. 4 is a block diagram of a power conversion system in accordance with an illustrative embodiment.
Figure 14:
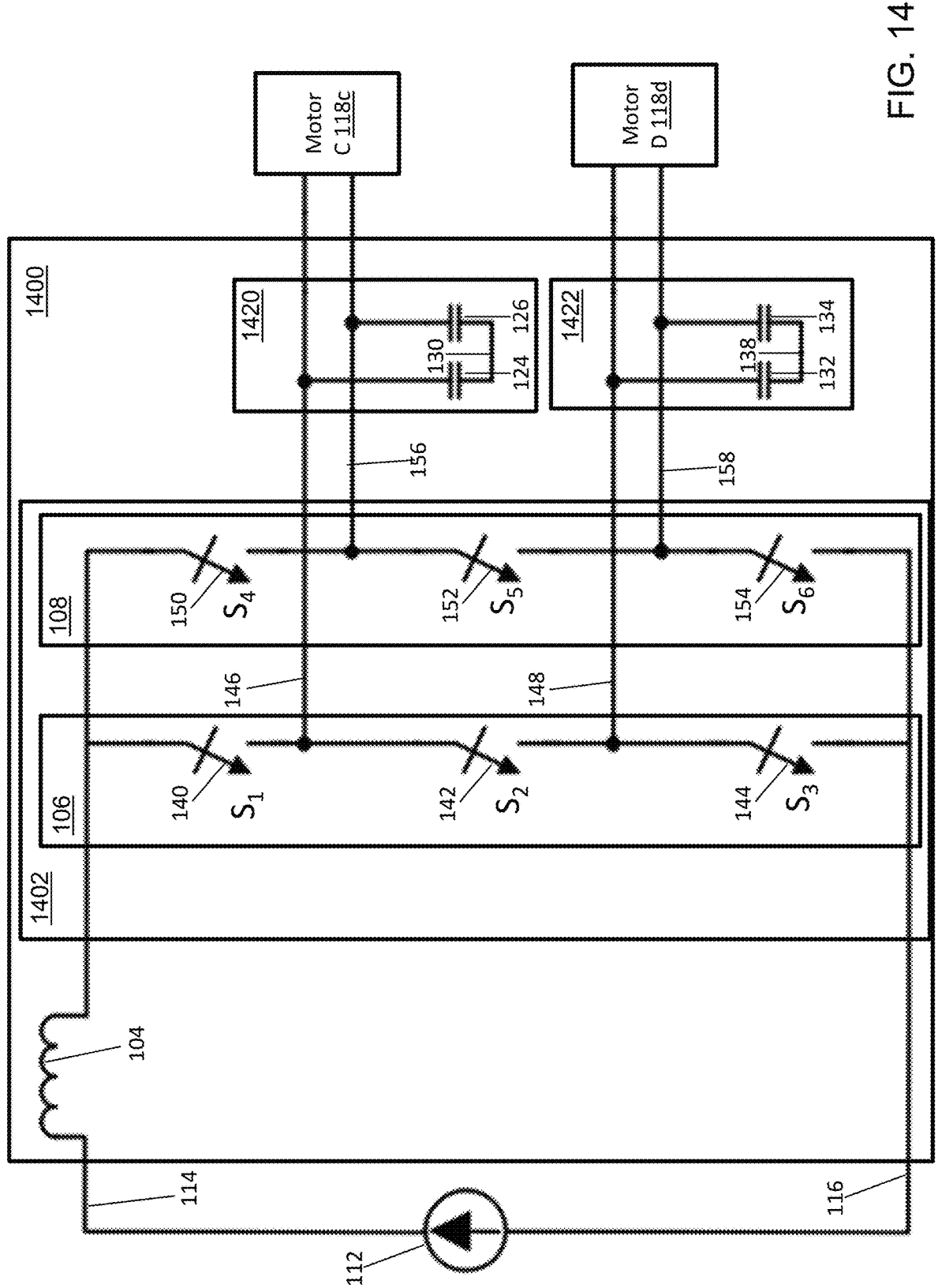
FIG. 14 is a circuit diagram of a balanced current source inverter in accordance with another illustrative embodiment.

Referring to FIG. 4, a block diagram of a power conversion system 400 is shown in accordance with an illustrative embodiment. Power conversion system 400 may include controller 402, DC source 112, AC load 404, a sensor(s) 418, and one or more of first CSI 100, second CSI 300, a third CSI 1400 (shown referring to FIG. 14), or a fourth CSI 1600 (shown referring to FIG. 16). For example, DC source 112 may be a DC current source such as a battery, a solar panel, a current source rectifier, etc. Controller 402 may be electrically connected to DC source 112 and to AC load 404 to receive voltage, current, and/or power values used to define the parameters that control the energy transfer between DC source 112 and AC load 404 through first CSI 100, second CSI 300, third CSI 1400, or fourth CSI 1600. For brevity, hereafter CSI 100, 300 refers to either first CSI 100, second CSI 300, third CSI 1400, or fourth CSI 1600 as well as other CSI that support a greater or a fewer number of phases than shown in the illustrative embodiments.

Controller 402 is also electrically connected to CSI 100, 300 to receive a value of the DC-link current, for example, as well as to provide the gating signals, for example, to PWM signal generator 206 of each inverter leg switch as well as optionally to tenth switch 302 to control transmission of each on-state switching signal and each off-state switching signal. The voltage, current, and/or power values may be received for each switching frequency interval, also referred to herein as a switching period $T_s$, or may be received less frequently or more frequently depending on the dynamic needs of power conversion system 400.

Power conversion system 400 may include one or more sensors 418 of the same or different type to measure system characteristics to adjust energy transferred from DC source 112 to AC load 404. Sensor(s) 418 may measure a physical quantity in an environment to which the sensor is associated and generate a corresponding measurement datum that may be associated with a time that the measurement datum is generated. Illustrative sensors include a pressure sensor, a temperature sensor, a position or location sensor, a voltage sensor, a current sensor, a frequency sensor, a speed sensor, etc. that may be mounted to various components used as part of a system to which power conversion system 400 is providing and/or receiving power.

Controller 402 may include an input interface 406, an output interface 408, a computer-readable medium 410, a processor 412, a control application 414, and control data 416. Fewer, different, and additional components may be incorporated into controller 402. For example, controller 402 may include a communication interface (not shown). The communication interface provides an interface for receiving and transmitting data between devices using various protocols, transmission technologies, and media as understood by those skilled in the art. The communication interface may support communication using various transmission media that may be wired and/or wireless.

Input interface 406 provides an interface for receiving information from a user or from other devices for entry into controller 402 as understood by those skilled in the art. For example, controller 402 may receive a signal from sensor(s) 418 continuously, periodically, when an event occurs, etc. through input interface 406. Input interface 406 may further interface with various input technologies including, but not limited to, a keyboard, a mouse, a display, a track ball, a keypad, one or more buttons, etc. to allow the user to enter information into controller 402 or to make selections in a user interface displayed on the display. The same interface may support both input interface 406 and output interface 408. Controller 402 may have one or more input interfaces that use the same or a different input interface technology. Inputs through input interface 406 may include the voltage, current, and/or power values received from DC source 112 and/or AC load 404.

Output interface 408 provides an interface for outputting information for review by a user of controller 402 and for input to another device. For example, output interface 408 may interface with various output technologies including, but not limited to, a display. Controller 402 may have one or more output interfaces that use the same or a different interface technology. Additional outputs through output interface 408 from controller 402 may be the switching signals sent to one or more PWM signal generator 206 of each inverter leg switch and tenth switch 302. For example, control application 414 may determine which switches of CSI 100, 300 are in an on-state and which are in an off-state. These signals may be provided to the switches of CSI 100, 300 through output interface 408 using a respective PWM signal generator 206.

Computer-readable medium 410 is an electrical holding place or storage for information so the information can be accessed by processor 412 as understood by those skilled in the art. Computer-readable medium 410 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 402 may have one or more computer-readable media that use the same or a different memory media technology. For example, computer-readable medium 410 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Controller 402 also may have one or more drives that support the loading of a memory media such as a CD, DVD, an external hard drive, etc. One or more external hard drives further may be connected to controller 402 using the communication interface.

Processor 412 executes instructions as understood by those skilled in the art. The instructions may be carried out by a special purpose computer, logic circuits, or hardware circuits. Processor 412 may be implemented, for example, as a field programmable gate array. Processor 412 may be implemented in hardware and/or firmware. Processor 412 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 412 operably couples with input interface 406, with output interface 408, and with computer-readable medium 410 to receive, to send, and to process information. Processor 412 may retrieve a set of instructions from a permanent memory device and copy the instructions in an executable form to a temporary memory device that is generally some form of RAM. Controller 402 may include a plurality of processors that use the same or a different processing technology.

Control application 414 performs operations associated with implementing some or all of the control of CSI 100, 300 possibly based on sensor measurements from sensor(s) 418 among other sensors included as part of DC source 112 and AC load 404. The operations may be implemented using hardware, firmware, software, or any combination of these methods. Referring to the example embodiment of FIG. 4, control application 414 is implemented in software (comprised of computer-readable and/or computer-executable instructions) stored in computer-readable medium 410 and accessible by processor 412 for execution of the instructions that embody the operations of control application 414. Control application 414 may be written using one or more programming languages, assembly languages, scripting languages, etc.

Figure 5:
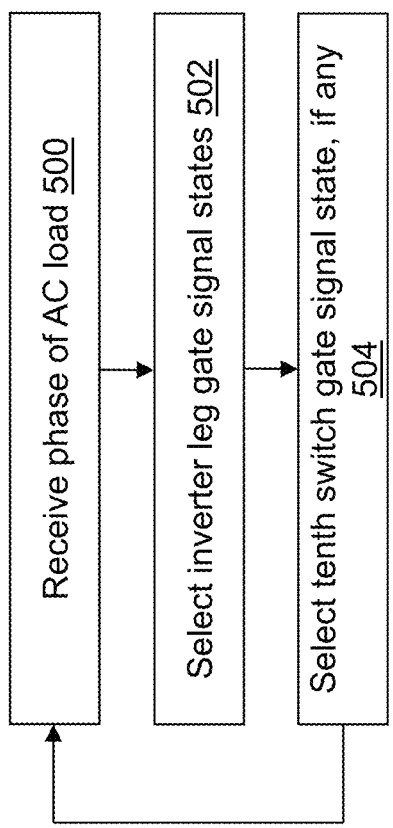
FIG. 5 depicts a flow diagram illustrating examples of operations performed by a controller of the current source inverter in accordance with an illustrative embodiment.

Referring to FIG. 5, example operations associated with control application 414 are described. Additional, fewer, or different operations may be performed depending on the embodiment of control application 414. The order of presentation of the operations of FIG. 5 is not intended to be limiting. Some of the operations may not be performed in some embodiments. Although some of the operational flows are presented in sequence, the various operations may be performed simultaneously, for example, using multiple threads, in various repetitions and/or in other orders than those that are illustrated, for example, using interrupts.

Though not shown, control data 416 may be read into a RAM type of computer readable medium 410 by control application 414 when controller 402 is executing. For example, control data 416 may include various switching frequency timing parameters precomputed for control application 414 for power conversion system 400 as described further below.

In an operation 500, a phase of AC load 404 may be received. A phase-locked-loop may be used to obtain a current three-phase voltage relationship at an output terminal from CSI 100, 300 to AC load 404.

In operation 502, an on-state or an off-state signal determination is made for each inverter leg switch of CSI 100, 300.

In operation 504, an on-state or an off-state signal determination is made for tenth RB switch 302 of CSI 300 if CSI 300 is used. Processing continues in operation 500 to continuously or periodically receive the phase and determine switch states for each inverter leg switch of CSI 100, 300 and for tenth RB switch 302 of CSI 300 if CSI 300 is used.

Referring to FIGS. 6A-6F, control signal time period snapshots for the example of first CSI 100 are shown in accordance with an illustrative embodiment. The control signal time period snapshots shown referring to FIGS. 6A-6F are used to determine whether each inverter leg switch is in the on-state or the off-state as described further below. Referring to FIGS. 7A-7F, control signal time period snapshots for the example of second CSI 300 are shown in accordance with an illustrative embodiment. The control signal time period snapshots shown referring to FIGS. 7A-7F are used to determine whether each inverter leg switch is in the on-state or the off-state and whether tenth RB switch 302 is in the on-state or the off-state as described further below.

To define the modulation of first CSI 100, for example, consider a three-phase balanced set of sinusoidal voltage waveforms desired at the output of first capacitive filter 120 and second capacitive filter 122 that is input to AC load 404. A first-phase output waveform (current, voltage, or power) that may include a first A-phase waveform created by operation of first inverter leg 106, is output on first, A phase line 146, and a second A-phase waveform created by operation of first inverter leg 106 is output on second, A phase line 148. The first A-phase waveform is 180 degrees out of phase relative to the second A-phase waveform. A second-phase output waveform (current, voltage, or power) that may include a first B-phase waveform created by operation of second inverter leg 108 is output on first, B phase line 156, and a second B-phase waveform created by operation of second inverter leg 108 is output on second, B phase line 158. The first B-phase waveform is 180 degrees out of phase relative to the second B-phase waveform. A third-phase output waveform (current, voltage, or power) that may include a first C-phase waveform created by operation of third inverter leg 110 is output on first, C phase line 166, and a second C-phase waveform created by operation of third inverter leg 110 is output on second, C phase line 168. The first C-phase waveform is 180 degrees out of phase relative to the second C-phase waveform. As understood by a person of skill in the art, the current and voltage waveforms are 360/m degrees out of phase with each other, where m represents a number of phases. Thus, a first A-phase voltage $V_{1,A}$, a first B-phase voltage $V_{1,B}$, and a first C-phase voltage $V_{1,C}$ are 120 degrees out of phase with each other; a first A-phase current $I_{1,A}$, a first B-phase current $I_{1,B}$, and a first C-phase current $I_{1,C}$ are 120 degrees out of phase with each other; a second A-phase voltage $V_{2,A}$, a second B-phase voltage $V_{2,B}$, and a second C-phase voltage $V_{2,C}$ are 120 degrees out of phase with each other; and a second A-phase current $I_{2,A}$, a second B-phase current $I_{2,B}$, and a second C-phase current $I_{2,C}$ are 120 degrees out of phase with each other. $V_{1,A}$, $V_{1,B}$, and $V_{1,C}$ and $V_{2,A}$, $V_{2,B}$, and $V_{2,C}$ are also 180 degrees out of phase with each other, respectively. $I_{1,A}$, $I_{1,B}$, and $I_{1,C}$ and also $I_{2,A}$, $I_{2,B}$, and $I_{2,C}$ are 180 degrees out of phase with each other, respectively.

A time interval of one period of the three-phase output waveforms can be divided into six sectors, depending on which of the phase voltages is the most positive and which of the phase voltages is the most negative. For example, in sector I, $V_{1,A}$ is the most positive and $V_{1,B}$ is the most negative; in sector II, $V_{1,A}$ is the most positive and $V_{1,C}$ is the most negative; in sector III, $V_{1,B}$ is the most positive and $V_{1,C}$ is the most negative; in sector IV, $V_{1,B}$ is the most positive and $V_{1,A}$ is the most negative; in sector V, $V_{1,C}$ is the most positive and $V_{1,A}$ is the most negative; and in sector VI, $V_{1,C}$ is the most positive and $V_{1,B}$ is the most negative. CSI 100, 300 remains in a sector for ⅙ of a fundamental period. For example, a fundamental period may be ¹⁄₆₀ for a 60 Hertz fundamental frequency. Once CSI 100, 300 completes one fundamental period, CSI 100, 300 returns to the first sector.

Figure 6E:
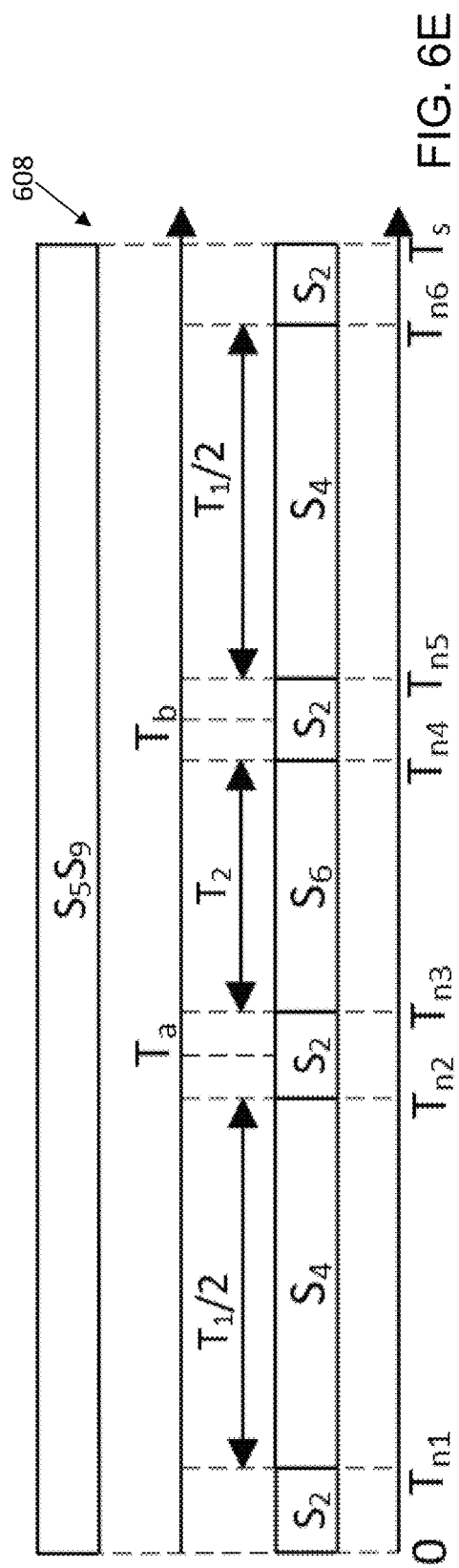
Figure 6F:
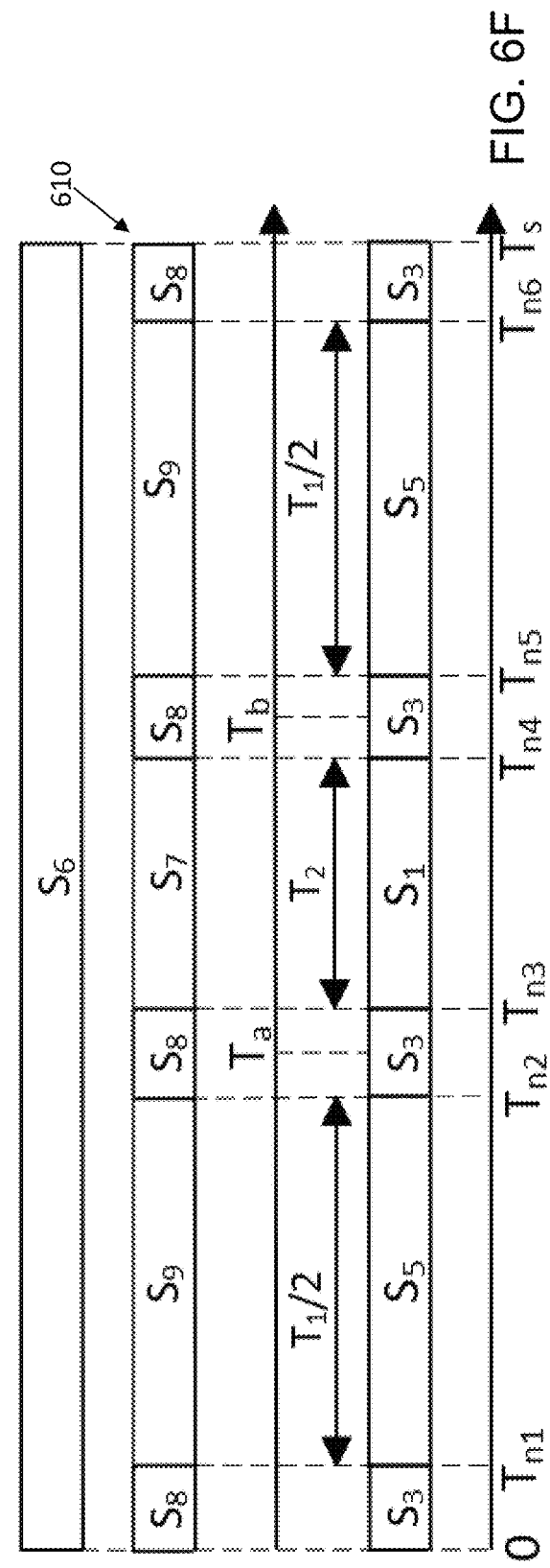

Control application 414 implements a control algorithm that operates first CSI 100 from sector I to sector VI as summarized in FIGS. 6A-6F respectively, and back to sector I in a continuous loop to continually respond to DC source 112 and/or AC load 404. FIG. 6A represents sector I. FIG. 6B represents sector II. FIG. 6C represents sector III. FIG. 6D represents sector IV. FIG. 6E represents sector V. FIG. 6F represents sector VI. Of course, when first CSI 100 implements a fewer or a greater number of phase currents, there are a fewer or a greater number of sectors. For example, first CSI 100 with a single phase has two sectors, and first CSI 100 with four phases has fourteen sectors though implemented in a similar manner.

Referring to FIGS. 6A-6F, $S_1$ indicates the on-state for first switch 140, $S_2$ indicates the on-state for eighth switch 162, $S_3$ indicates the on-state for fourth switch 150, $S_4$ indicates the on-state for second switch 142, $S_5$ indicates the on-state for seventh switch 160, $S_6$ indicates the on-state for fifth switch 152, $S_7$ indicates the on-state for third switch 144, $S_8$ indicates the on-state for sixth switch 154, and $S_9$ indicates the on-state for ninth switch 164.

The pulses indicate when the respective RB switches are turned on. The non-designated switches in each sector are in the off-state unless shown in a pulse. For example, "$S_1S_4$" indicates that the respective pair of switches that includes first switch 140 and second switch 142 are in the on-state based on an on-state control signal provided by the respective PWM signal generator 206 connected to first switch 140 and second switch 142. As another example, "$S_1S_6$" indicates that the respective pair of switches that includes first switch 140 and fifth switch 152 are in the on-state based on an on-state control signal provided by the respective PWM signal generator 206 connected to first switch 140 and fifth switch 152. As yet another example, "$S_7$" indicates that third switch 144 is in the on-state based on an on-state control signal provided by the respective PWM signal generator 206 connected to third switch 144. Though not shown, all of the on-state signals of first CSI 100 pass through a turn-off delay logic to implement an overlap time as understood by a person of skill in the art.

Referring to FIG. 6A, a sector I pulse sequence 600 is shown in accordance with an illustrative embodiment. Third switch 144 is in the on-state from a start of the switching interval indicated as "0" to an end of the switching period designated as $T_s$ to show a single switching period. First switch 140 and second switch 142 are in the on-state from the start of the switching interval to a time designated as $T_{n1}$; first switch 140 and fifth switch 152 are in the on-state from the time designated as $T_{n1}$ to a time designated as $T_{n2}$; first switch 140 and second switch 142 are in the on-state from the time designated as $T_{n2}$ to a time designated as $T_{n3}$; first switch 140 and eighth switch 162 are in the on-state from the time designated as $T_{n3}$ to a time designated as $T_{n4}$; first switch 140 and second switch 142 are in the on-state from the time designated as $T_{n4}$ to a time designated as $T_{n5}$; and first switch 140 and fifth switch 152 are in the on-state from the time designated as $T_{n5}$ to a time designated as $T_{n6}$; first switch 140 and second switch 142 are in the on-state from the time designated as $T_{n6}$ to the end of the switching period.

The time values can be determined based on known time values for a conventional CSI using six switches (H6-CSI), for example, as described in B. Wu, High-Power Converters and AC Drives, Ch. 10, pp. 189-218, Wiley, 2006. $T_s$ is the inverter switching period, and $f_s$ is a switching frequency, where $$T_s = \frac{1}{f_s} \cdot I_{ref}$$

is a desired inverter output current waveform peak value, $I_d$ is an inverter DC-link current value, and $m_a$ is a modulation index that ranges from 0 to 1, where $$m_a = \frac{I_{ref}}{I_d}.$$

$T_1$ is the H6-CSI space vector $S_1S_6$'s dwell time in one $T_s$ without considering overlap time, and θ is an angle of the space vector, where $$T_1 = m_aT_s\sin\left(\frac{\pi}{6} - \theta\right).$$

$T_2$ is the H6-CSI space vector $S_1S_2$'s dwell time in one $T_s$ without considering overlap time, where $$T_2 = m_aT_s\sin\left(\frac{\pi}{6} + \theta\right).$$

$T_0$ is the H6-CSI space vector zero state's dwell time in one $T_s$ without considering overlap time, where $T_0=T_s-T_1-T_2$. Using these values, $$T_a = \frac{T_1}{2} + \frac{3}{8}T_0, T_b = T_a + T_2 + \frac{1}{4}T_0, T_{n1} = \frac{T_0}{4}, T_{n2} = T_a - \frac{T_0}{8},$$
$$T_{n3} = T_a + \frac{T_0}{8}, T_{n4} = T_b - \frac{T_0}{8}, T_{n5} = T_b + \frac{T_0}{8}, \text{ and } T_{n6} = T_s - \frac{T_0}{4}.$$

Referring to FIG. 6B, a sector II pulse sequence 602 is shown in accordance with an illustrative embodiment. Ninth switch 164 is in the on-state from the start of the switching interval to the time designated as $T_{n1}$. Third switch 144 is in the on-state from the time designated as $T_{n1}$ to the time designated as $T_{n2}$. Ninth switch 164 is in the on-state from the time designated as $T_{n2}$ to the time designated as $T_{n3}$. Sixth switch 154 is in the on-state from the time designated as $T_{n3}$ to the time designated as $T_{n4}$. Ninth switch 164 is in the on-state from the time designated as $T_{n4}$ to the time designated as $T_{n5}$. Third switch 144 is in the on-state from the time designated as $T_{n5}$ to the time designated as $T_{n6}$. Ninth switch 164 is in the on-state from the time designated as $T_{n6}$ to the end of the switching period.

Eighth switch 162 and seventh switch 160 are in the on-state from the start of the switching interval to a time designated as $T_{n1}$; first switch 140 and eighth switch 162 are in the on-state from the time designated as $T_{n1}$ to a time designated as $T_{n2}$; eighth switch 162 and seventh switch 160 are in the on-state from the time designated as $T_{n2}$ to a time designated as $T_{n3}$; eighth switch 162 and fourth switch 150 are in the on-state from the time designated as $T_{n3}$ to a time designated as $T_{n4}$; eighth switch 162 and seventh switch 160 are in the on-state from the time designated as $T_{n4}$ to a time designated as $T_{n5}$; first switch 140 and eighth switch 162 are in the on-state from the time designated as $T_{n5}$ to a time designated as $T_{n6}$; and eighth switch 162 and seventh switch 160 are in the on-state from the time designated as $T_{n6}$ to the end of the switching period.

Referring to FIG. 6C, a sector III pulse sequence 604 is shown in accordance with an illustrative embodiment. Sixth switch 154 is in the on-state from the start of the switching interval to the end of the switching period. First switch 140 and second switch 142 are in the on-state from the start of the switching interval to a time designated as $T_{n1}$; fourth switch 150 and second switch 142 are in the on-state from the time designated as $T_{n1}$ to a time designated as $T_{n2}$; first switch 140 and second switch 142 are in the on-state from the time designated as $T_{n2}$ to a time designated as $T_{n3}$; second switch 142 and seventh switch 160 are in the on-state from the time designated as $T_{n3}$ to a time designated as $T_{n4}$; first switch 140 and second switch 142 are in the on-state from the time designated as $T_{n4}$ to a time designated as $T_{n5}$; and fourth switch 150 and second switch 142 are in the on-state from the time designated as $T_{n5}$ to a time designated as $T_{n6}$; first switch 140 and second switch 142 are in the on-state from the time designated as $T_{n6}$ to the end of the switching period.

Referring to FIG. 6D, a sector IV pulse sequence 606 is shown in accordance with an illustrative embodiment. Third switch 144 is in the on-state from the start of the switching interval to the time designated as $T_{n1}$. Sixth switch 154 is in the on-state from the time designated as $T_{n1}$ to the time designated as $T_{n2}$. Third switch 144 is in the on-state from the time designated as $T_{n2}$ to the time designated as $T_{n3}$. Ninth switch 164 is in the on-state from the time designated as $T_{n3}$ to the time designated as $T_{n4}$. Third switch 144 is in the on-state from the time designated as $T_{n4}$ to the time designated as $T_{n5}$. Sixth switch 154 is in the on-state from the time designated as $T_{n5}$ to the time designated as $T_{n6}$. Third switch 144 is in the on-state from the time designated as $T_{n6}$ to the end of the switching period.

First switch 140 and second switch 142 are in the on-state from the start of the switching interval to a time designated as $T_{n1}$; fourth switch 150 and second switch 142 are in the on-state from the time designated as $T_{n1}$ to a time designated as $T_{n2}$; first switch 140 and second switch 142 are in the on-state from the time designated as $T_{n2}$ to a time designated as $T_{n3}$; second switch 142 and seventh switch 160 are in the on-state from the time designated as $T_{n3}$ to a time designated as $T_{n4}$; first switch 140 and second switch 142 are in the on-state from the time designated as $T_{n4}$ to a time designated as $T_{n5}$; fourth switch 150 and second switch 142 are in the on-state from the time designated as $T_{n5}$ to a time designated as $T_{n6}$; and first switch 140 and second switch 142 are in the on-state from the time designated as $T_{n6}$ to the end of the switching period.

Referring to FIG. 6E, a sector V pulse sequence 608 is shown in accordance with an illustrative embodiment. Ninth switch 164 is in the on-state from the start of the switching interval to the end of the switching period. Eighth switch 162 and seventh switch 160 are in the on-state from the start of the switching interval to a time designated as $T_{n1}$; second switch 142 and seventh switch 160 are in the on-state from the time designated as $T_{n1}$ to a time designated as $T_{n2}$; eighth switch 162 and seventh switch 160 are in the on-state from the time designated as $T_{n2}$ to a time designated as $T_{n3}$; seventh switch 160 and fifth switch 152 are in the on-state from the time designated as $T_{n3}$ to a time designated as $T_{n4}$; eighth switch 162 and seventh switch 160 are in the on-state from the time designated as $T_{n4}$ to a time designated as $T_{n5}$; and second switch 142 and seventh switch 160 are in the on-state from the time designated as $T_{n5}$ to a time designated as $T_{n6}$; eighth switch 162 and seventh switch 160 are in the on-state from the time designated as $T_{n6}$ to the end of the switching period.

Referring to FIG. 6F, a sector VI pulse sequence 610 is shown in accordance with an illustrative embodiment. Sixth switch 154 is in the on-state from the start of the switching interval to the time designated as $T_{n1}$. Ninth switch 164 is in the on-state from the time designated as $T_{n1}$ to the time designated as $T_{n2}$. Sixth switch 154 is in the on-state from the time designated as $T_{n2}$ to the time designated as $T_{n3}$. Third switch 144 is in the on-state from the time designated as $T_{n3}$ to the time designated as $T_{n4}$. Sixth switch 154 is in the on-state from the time designated as $T_{n4}$ to the time designated as $T_{n5}$. Ninth switch 164 is in the on-state from the time designated as $T_{n5}$ to the time designated as $T_{n6}$. Sixth switch 154 is in the on-state from the time designated as $T_{n6}$ to the end of the switching period.

Fourth switch 150 and fifth switch 152 are in the on-state from the start of the switching interval to a time designated as $T_{n1}$; seventh switch 160 and fifth switch 152 are in the on-state from the time designated as $T_{n1}$ to a time designated as $T_{n2}$; fourth switch 150 and fifth switch 152 are in the on-state from the time designated as $T_{n2}$ to a time designated as $T_{n3}$; first switch 140 and fifth switch 152 are in the on-state from the time designated as $T_{n3}$ to a time designated as $T_{n4}$; fourth switch 150 and fifth switch 152 are in the on-state from the time designated as $T_{n4}$ to a time designated as $T_{n5}$; seventh switch 160 and fifth switch 152 are in the on-state from the time designated as $T_{n5}$ to a time designated as $T_{n6}$; and fourth switch 150 and fifth switch 152 are in the on-state from the time designated as $T_{n6}$ to the end of the switching period.

In the sector I to sector VI pulse sequences summarized in FIGS. 6A-6F, each RB switch of a single inverter leg of first inverter leg 106, second inverter leg 108, and third inverter leg 110 is controlled to enter the on-state for the time period $$\frac{T_0}{4}$$

before and after a transition from the on-state to the off-state of a pair of RB switches selected from different inverter legs of first inverter leg 106, second inverter leg 108, and third inverter leg 110 with third RB switch 144, sixth RB switch 154, or ninth RB switch 164 selected from a common inverter leg of one RB switch of the pair of RB switches. For example, referring again to FIG. 6A, first switch 140, second switch 142, and third switch 144 are in the on-state from the time designated as $T_{n2}$ to the time designated as $T_{n3}$, where $$T_{n3} - T_{n2} = \frac{T_0}{4},$$

after fifth switch 152 transition from the on-state to the off-state. First switch 140 and fifth switch 152 are in first inverter leg 106 and second inverter leg 108, respectively, and third RB switch 144 is in first inverter leg 106.

For example, referring again to FIG. 6B, seventh switch 160, eighth switch 162, and ninth switch 164 are in the on-state from the time designated as $T_{n2}$ to the time designated as $T_{n3}$, where $$T_{n3} - T_{n2} = \frac{T_0}{4},$$

after eighth switch 162 transition from the on-state to the off-state. First switch 140 and eighth switch 162 are in first inverter leg 106 and third inverter leg 110, respectively, and ninth switch 164 is in third inverter leg 110.

To summarize, there are four acceptable switching states (A, B, C, and D) for any of first inverter leg 106, second inverter leg 108, and third inverter leg 110:

Switching state A: upper and lower switches are on, and the middle switch is off. For first inverter leg 106, $S_1$ and $S_7$ are on, $S_4$ is off; for second inverter leg 108, $S_3$ and $S_8$ are on, $S_6$ is off; and for third inverter leg 110, $S_5$ and $S_9$ are on, $S_2$ is off.

Switching state B: upper and lower switches are off, and the middle switch is on. For first inverter leg 106, $S_1$ and $S_7$ are off, $S_4$ is on; for second inverter leg 108, $S_3$ and $S_8$ are off, $S_6$ is on; and for third inverter leg 110, $S_5$ and $S_9$ are off, $S_2$ is on.

Switching state C: all three switches are off. For first inverter leg 106, $S_1$, $S_4$, and $S_7$ are off; for second inverter leg 108, $S_3$, $S_6$, and $S_8$ are off; and for third inverter leg 110, $S_5$, $S_2$, and $S_9$ are off, Switching state D: all three switches are on. For first inverter leg 106, $S_1$, $S_4$, and $S_7$ are on; for second inverter leg 108, $S_3$, $S_6$, and $S_8$ are on; and for third inverter leg 110, $S_5$, $S_2$, and $S_9$ are on.

If none of the three phase legs is in switching state D, one of the three phase legs must be in switching state A, one of the phase legs must be in switching state B, and one of the phase legs must be in switching state C. Acceptable combinations are shown in Table I below.

TABLE I

| First inverter leg 106 | Second inverter leg 108 | Third inverter leg 110 |
|---|---|---|
| A | B | C |
| A | C | B |
| B | A | C |
| B | C | A |
| C | A | B |
| C | B | A |

If one of the three phase legs is in switching state D, then the two other phase legs must be in switching state C. For all the switching states, during the transition process, a turn-off delay is implemented to guarantee a continuous current path for the dc-link inductor, inductor 104.

Figure 7A:
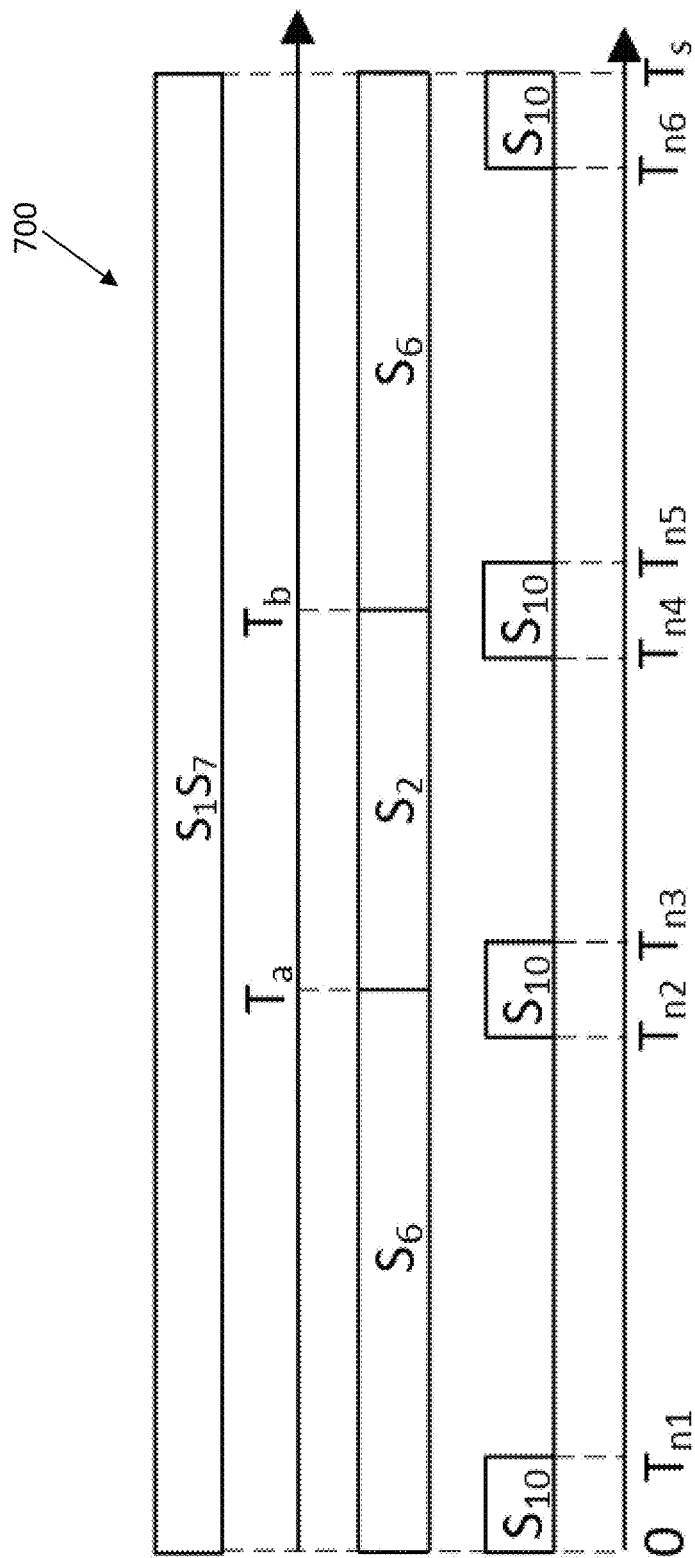
FIGS. 7A-7F are control signal time period snapshots for the current source inverter of FIG. 3 when providing power to the AC load in accordance with an illustrative embodiment.

Similar to FIGS. 6A-6F, referring to FIGS. 7A-7F, show the sector pulse sequence for second CSI 300. Referring to FIG. 7A, a sector I pulse sequence 700 is shown in accordance with an illustrative embodiment. Third switch 144 is in the on-state from the start of the switching interval indicated as "0" to an end of the switching period designated as $T_s$ to show a single switching period. Tenth switch 302 is in the on-state from the start of the switching interval to the time designated as $T_{n1}$, from the time designated as $T_{n2}$ to a time designated as $T_{n3}$, from the time designated as $T_{n4}$ to the time designated as $T_n$S, and from the time designated as $T_{n6}$ to the end of the switching period. First switch 140 and fifth switch 152 are in the on-state from the start of the switching interval to a time designated as $T_a$; first switch 140 and eighth switch 162 are in the on-state from the time designated as $T_a$ to a time designated as $T_b$; and first switch 140 and fifth switch 152 are in the on-state from the time designated as $T_b$ to the end of the switching period.

Figure 7B:
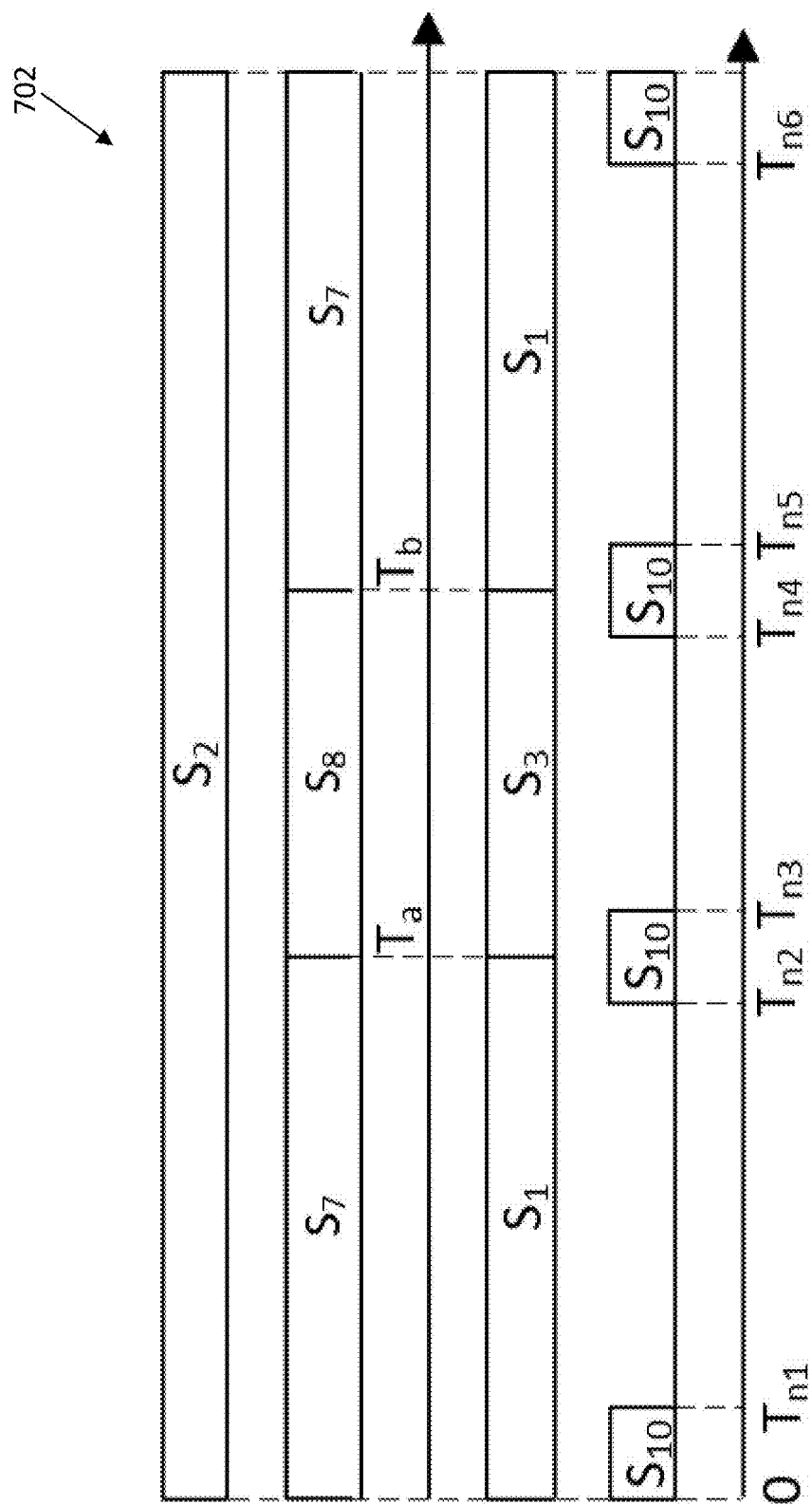

Referring to FIG. 7B, a sector II pulse sequence 702 is shown in accordance with an illustrative embodiment. Third switch 144 is in the on-state from the start of the switching interval to a time designated as $T_a$; sixth switch 154 is in the on-state from the time designated as $T_a$ to a time designated as $T_b$; and third switch 144 is in the on-state from the time designated as $T_b$ to the end of the switching period. Tenth switch 302 is in the on-state from the start of the switching interval to the time designated as $T_{n1}$, from the time designated as $T_{n2}$ to a time designated as $T_{n3}$, from the time designated as $T_{n4}$ to the time designated as $T_{n5}$, and from the time designated as $T_{n6}$ to the end of the switching period. First switch 140 and eighth switch 162 are in the on-state from the start of the switching interval to a time designated as $T_a$; eighth switch 162 and fourth switch 150 are in the on-state from the time designated as $T_a$ to a time designated as $T_b$; and first switch 140 and eighth switch 162 are in the on-state from the time designated as $T_b$ to the end of the switching period.

Figure 7C:
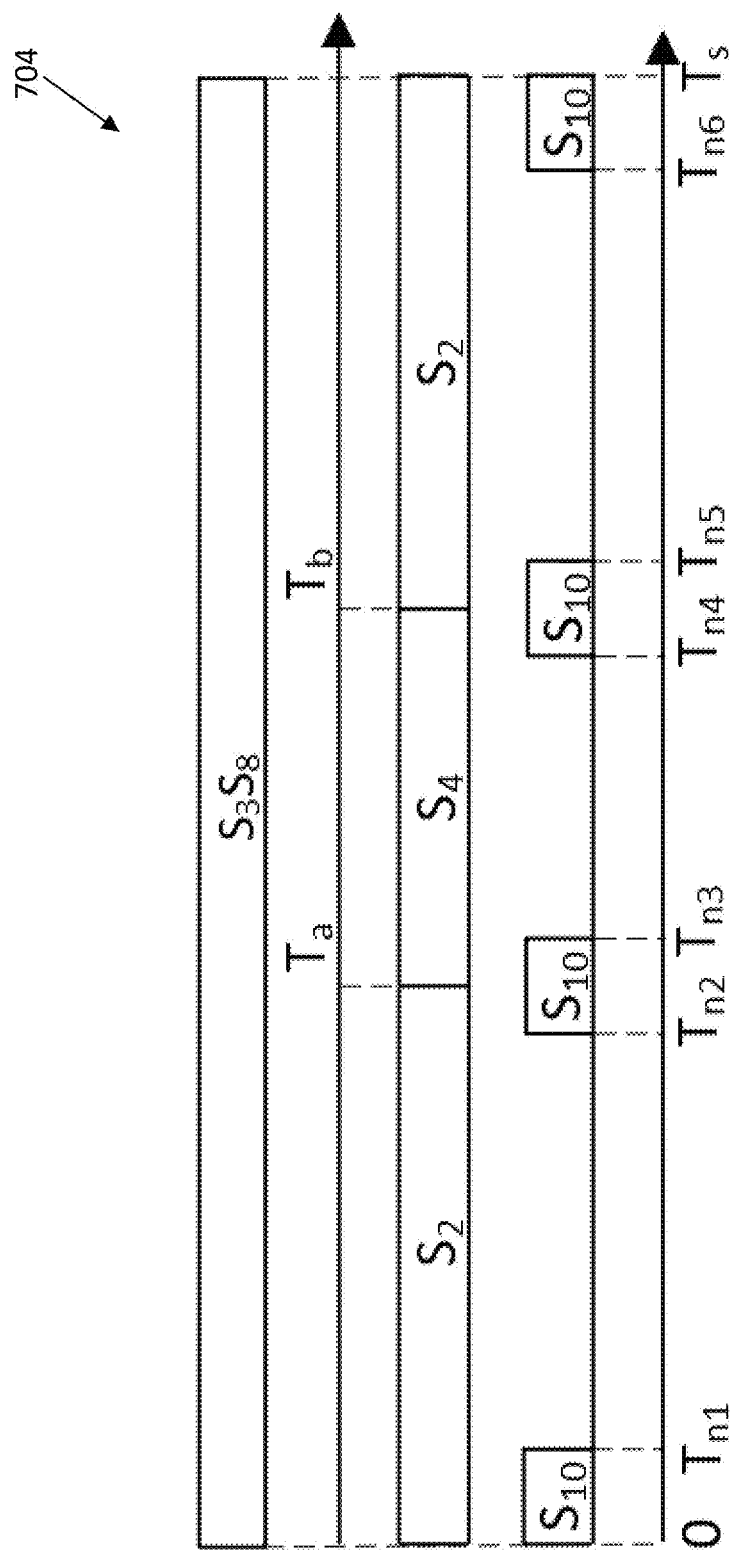

Referring to FIG. 7C, a sector III pulse sequence 704 is shown in accordance with an illustrative embodiment. Sixth switch 154 is in the on-state from the start of the switching interval indicated as "0" to an end of the switching period designated as $T_s$ to show a single switching period. Tenth switch 302 is in the on-state from the start of the switching interval to the time designated as $T_{n1}$, from the time designated as $T_{n2}$ to a time designated as $T_{n3}$, from the time designated as $T_{n4}$ to the time designated as $T_{n5}$, and from the time designated as $T_{n6}$ to the end of the switching period. Eighth switch 162 and fourth switch 150 are in the on-state from the start of the switching interval to a time designated as $T_a$; fourth switch 150 and second switch 142 are in the on-state from the time designated as $T_a$ to a time designated as $T_b$; and eighth switch 162 and fourth switch 150 are in the on-state from the time designated as $T_b$ to the end of the switching period.

Figure 7D:
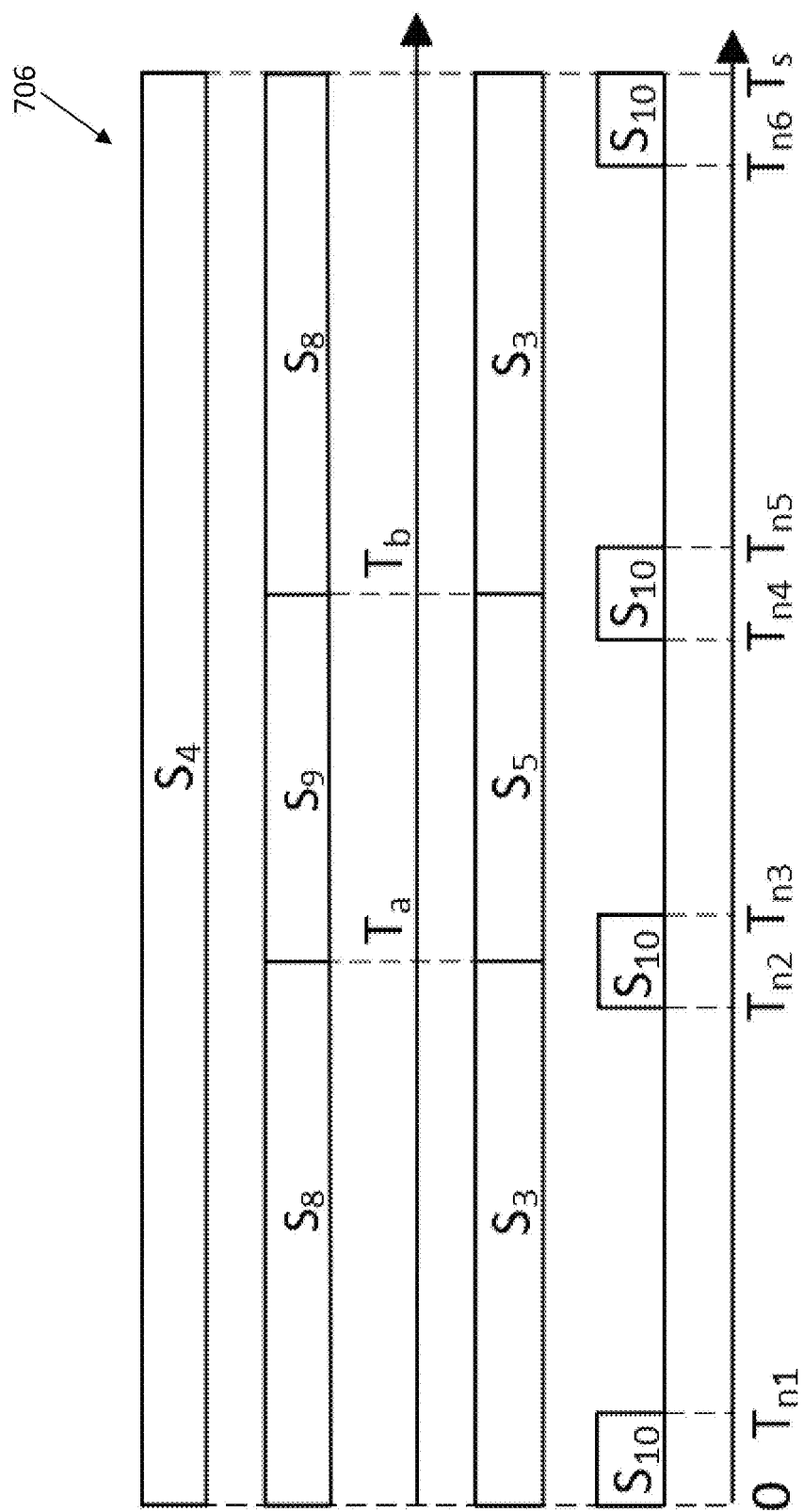

Referring to FIG. 7D, a sector IV pulse sequence 706 is shown in accordance with an illustrative embodiment. Sixth switch 154 is in the on-state from the start of the switching interval to a time designated as $T_a$; ninth switch 164 is in the on-state from the time designated as $T_a$ to a time designated as $T_b$; and sixth switch 154 is in the on-state from the time designated as $T_b$ to the end of the switching period. Tenth switch 302 is in the on-state from the start of the switching interval to the time designated as $T_{n1}$, from the time designated as $T_{n2}$ to a time designated as $T_{n3}$, from the time designated as $T_{n4}$ to the time designated as $T_{n5}$, and from the time designated as $T_{n6}$ to the end of the switching period. Fourth switch 150 and second switch 142 are in the on-state from the start of the switching interval to a time designated as $T_a$; second switch 142 and seventh switch 160 are in the on-state from the time designated as $T_a$ to a time designated as $T_b$; and fourth switch 150 and second switch 142 are in the on-state from the time designated as $T_b$ to the end of the switching period.

Figure 7E:
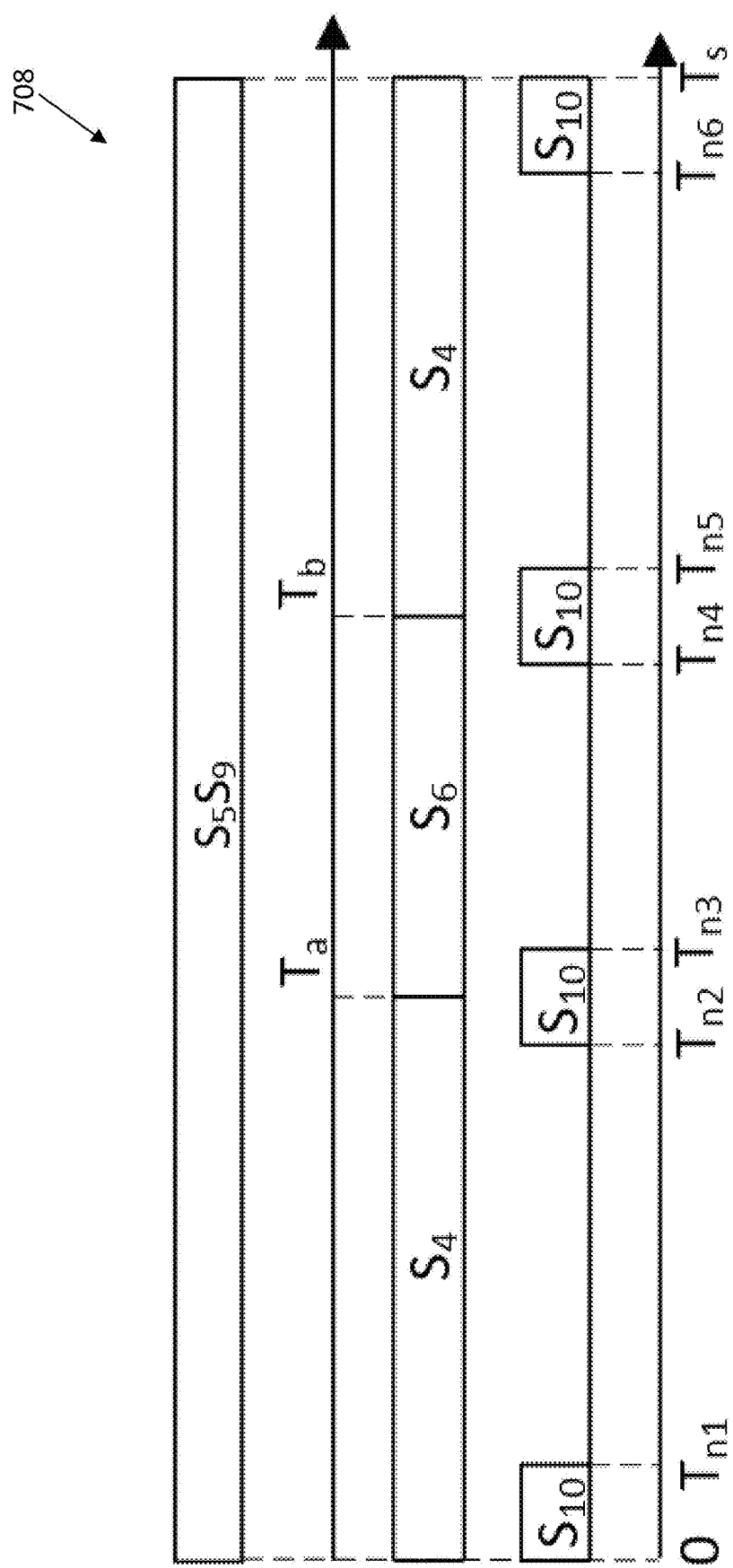

Referring to FIG. 7E, a sector V pulse sequence 708 is shown in accordance with an illustrative embodiment. Ninth switch 164 is in the on-state from the start of the switching interval indicated as "0" to an end of the switching period designated as $T_s$ to show a single switching period. Tenth switch 302 is in the on-state from the start of the switching interval to the time designated as $T_{n1}$, from the time designated as $T_{n2}$ to a time designated as $T_{n3}$, from the time designated as $T_{n4}$ to the time designated as $T_{n5}$, and from the time designated as $T_{n6}$ to the end of the switching period. Second switch 162 and seventh switch 160 are in the on-state from the start of the switching interval to a time designated as $T_a$; seventh switch 160 and fifth switch 152 are in the on-state from the time designated as $T_a$ to a time designated as $T_b$; and second switch 162 and seventh switch 160 are in the on-state from the time designated as $T_b$ to the end of the switching period.

Figure 7F:
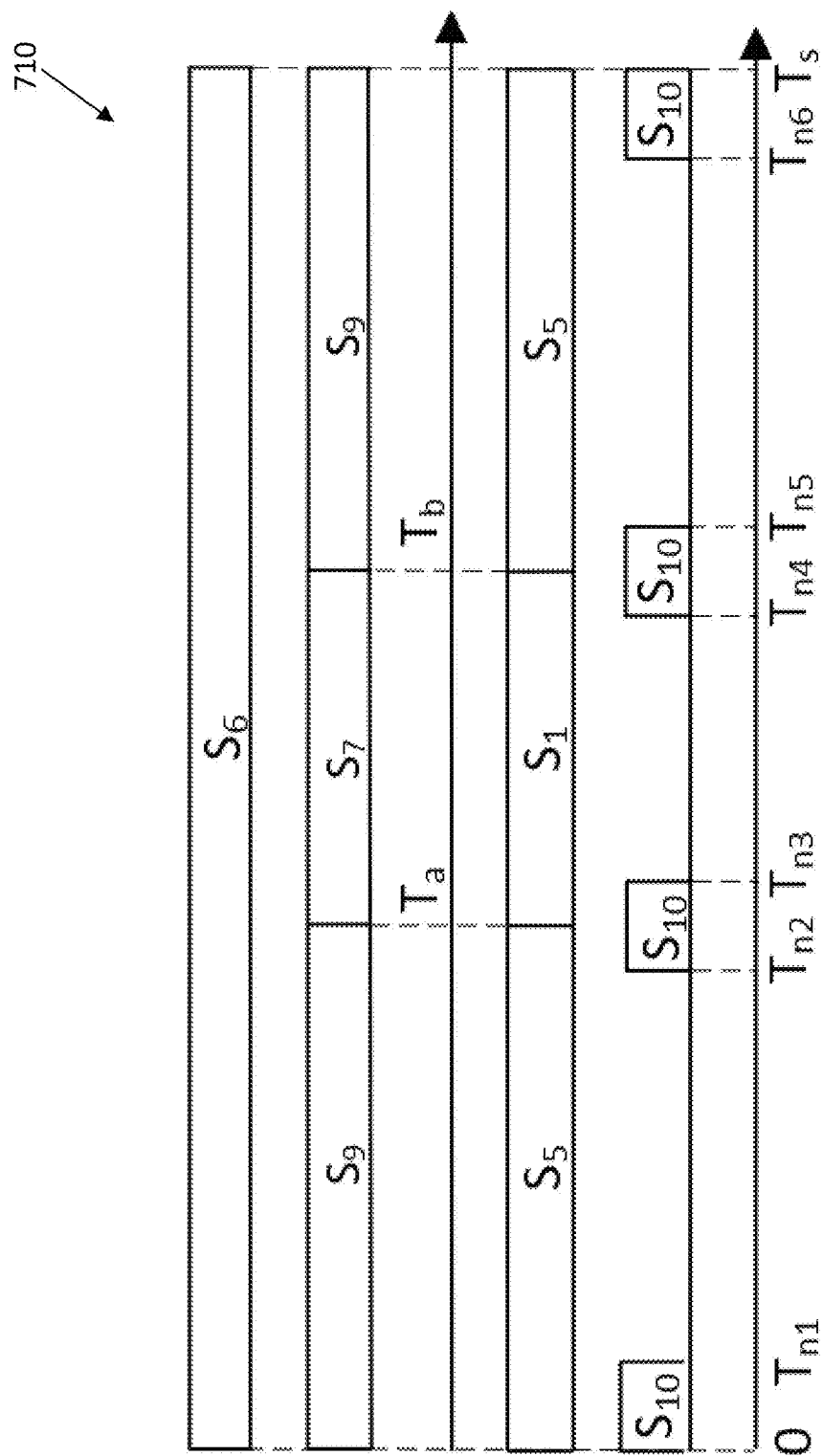

Referring to FIG. 7F, a sector VI pulse sequence 710 is shown in accordance with an illustrative embodiment. Ninth switch 164 is in the on-state from the start of the switching interval to a time designated as $T_a$; third switch 144 is in the on-state from the time designated as $T_a$ to a time designated as $T_b$; and ninth switch 164 is in the on-state from the time designated as $T_b$ to the end of the switching period. Tenth switch 302 is in the on-state from the start of the switching interval to the time designated as $T_{n1}$, from the time designated as $T_{n2}$ to a time designated as $T_{n3}$, from the time designated as $T_{n4}$ to the time designated as $T_{n5}$, and from the time designated as $T_{n6}$ to the end of the switching period. Seventh switch 160 and fifth switch 152 are in the on-state from the start of the switching interval to a time designated as $T_a$; first switch 140 and fifth switch 152 are in the on-state from the time designated as $T_a$ to a time designated as $T_b$; and seventh switch 160 and fifth switch 152 are in the on-state from the time designated as $T_b$ to the end of the switching period.

Having tenth switch 302 controlled to enter the on-state for the time period $$\frac{T_0}{4}$$

before and after a transition from the on-state to the off-state of a pair of RB switches provides zero current switching for first inverter leg 106, second inverter leg 108, and third inverter leg 110. One of first switch 140, fourth switch 150, or seventh switch 160 is controlled to enter the on-state for the time period $$\frac{T_1}{2} + \frac{3T_0}{8}$$

at the stat and the end of the switching period. One of second switch 142, fifth switch 152, or eighth switch 162 is also controlled to enter the on-state for the time period $$\frac{T_1}{2} + \frac{3T_0}{8}$$

at the start and the end of the switching period. One of third switch 144, sixth switch 154, or ninth switch 164 is also controlled to enter the on-state for the time period $$\frac{T_1}{2} + \frac{3T_0}{8}$$

at the start and the end of the switching period. One of first switch 140, fourth switch 150, or seventh switch 160 is controlled to enter the on-state for the time period $$T_b - T_a = T_2 + \frac{T_0}{4}.$$

One of second switch 142, fifth switch 152, or eighth switch 162 is also controlled to enter the on-state for the time period $$T_b - T_a = T_2 + \frac{T_0}{4}.$$

One of third switch 144, sixth switch 154, or ninth switch 164 is also controlled to enter the on-state for the time period $$T_b - T_a = T_2 + \frac{T_0}{4}.$$

To summarize, there are three acceptable switching states (A, B, and C) for first inverter leg 106, second inverter leg 108, and third inverter leg 110. The acceptable combinations are shown in Table I above.

Irrespective of whether tenth switch 302 is an the on-state or the off-state, one of first inverter leg 106, second inverter leg 108, and third inverter leg 110 is in switching state A, one of first inverter leg 106, second inverter leg 108, and third inverter leg 110 is in switching state B, and one of first inverter leg 106, second inverter leg 108, and third inverter leg 110 is in switching state C. Tenth switch 302 can be in its on-state or off-state at any time instant. The switching condition of tenth switch 302 does not depend on the switching states of first inverter leg 106, second inverter leg 108, and third inverter leg 110. However, any change in the switching state of any of first inverter leg 106, second inverter leg 108, and third inverter leg 110 occurs only when tenth switch 302 is in its on-state.

Figure 8:
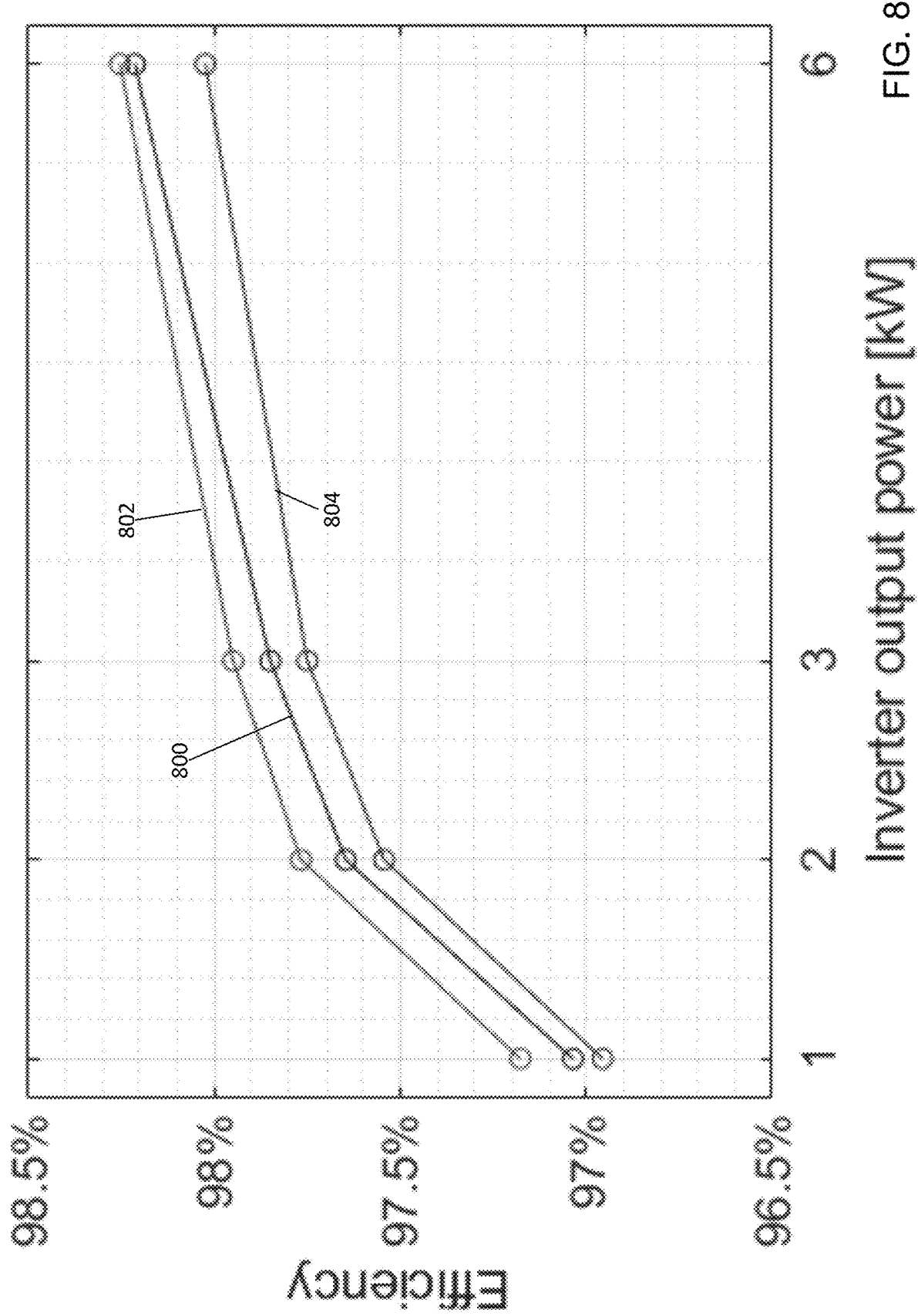
FIG. 8 shows a simulated efficiency comparison using the current source inverter of FIG. 1, the current source inverter of FIG. 3, and a conventional H6-CSI in accordance with an illustrative embodiment.

Referring to FIG. 8, a simulated efficiency comparison is shown between first CSI 100, second CSI 300, and a conventional H6-CSI in accordance with an illustrative embodiment. A first efficiency curve 800 shows the simulated efficiency for first CSI 100. A second efficiency curve 802 shows the simulated efficiency for second CSI 300. A third efficiency curve 804 shows the simulated efficiency for H6-CSI. Second CSI 300 provides a higher efficiency than first CSI 100, and first CSI 100 provides a higher efficiency than H6-CSI. Second CSI 300 was predicted to deliver 0.25% increase in efficiency at 6 kilowatts (kW) corresponding to a 12.5% reduction of loss compared to the H6-CSI. The required DC-link current amplitude on first bus line 114 of both first CSI 100 and second CSI 300 was also reduced from 15.5 Amps (A) using H6-CSI to 10.8 A for a 30% reduction under 6 kW operation. Such a significant reduction of the DC-link current makes an inductance of inductor 104 much lower than that using H6-CSI.

Figure 9:
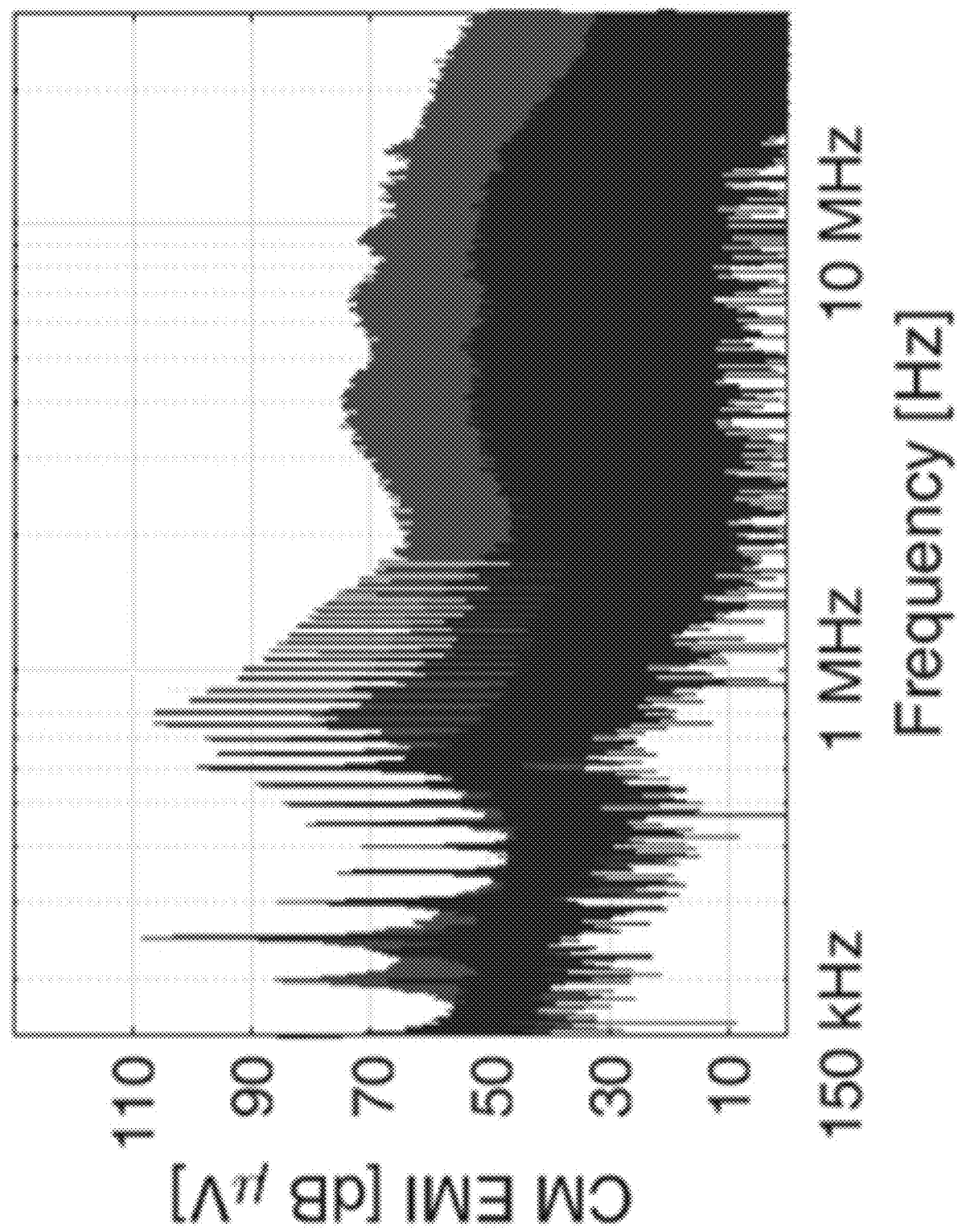
FIG. 9 shows a simulated common mode electro-magnetic interference (CM EMI) comparison between the current source inverter of FIG. 1 and the conventional H6-CSI in accordance with an illustrative embodiment.

Referring to FIG. 9, a simulated common mode electromagnetic interference (CM EMI) comparison is shown between first CSI 100 and H6-CSI in accordance with an illustrative embodiment. The H6-CSI CM EMI is shown in red, and the first CSI 100 CM EMI is shown in blue. Switching events in the upper and lower rows of each inverter leg of first CSI 100 cancel with ideal switching resulting in a CM EMI that is 20 decibel microvolts (dBµV), or ten times, lower when compared to H6-CSI.

Figure 10:
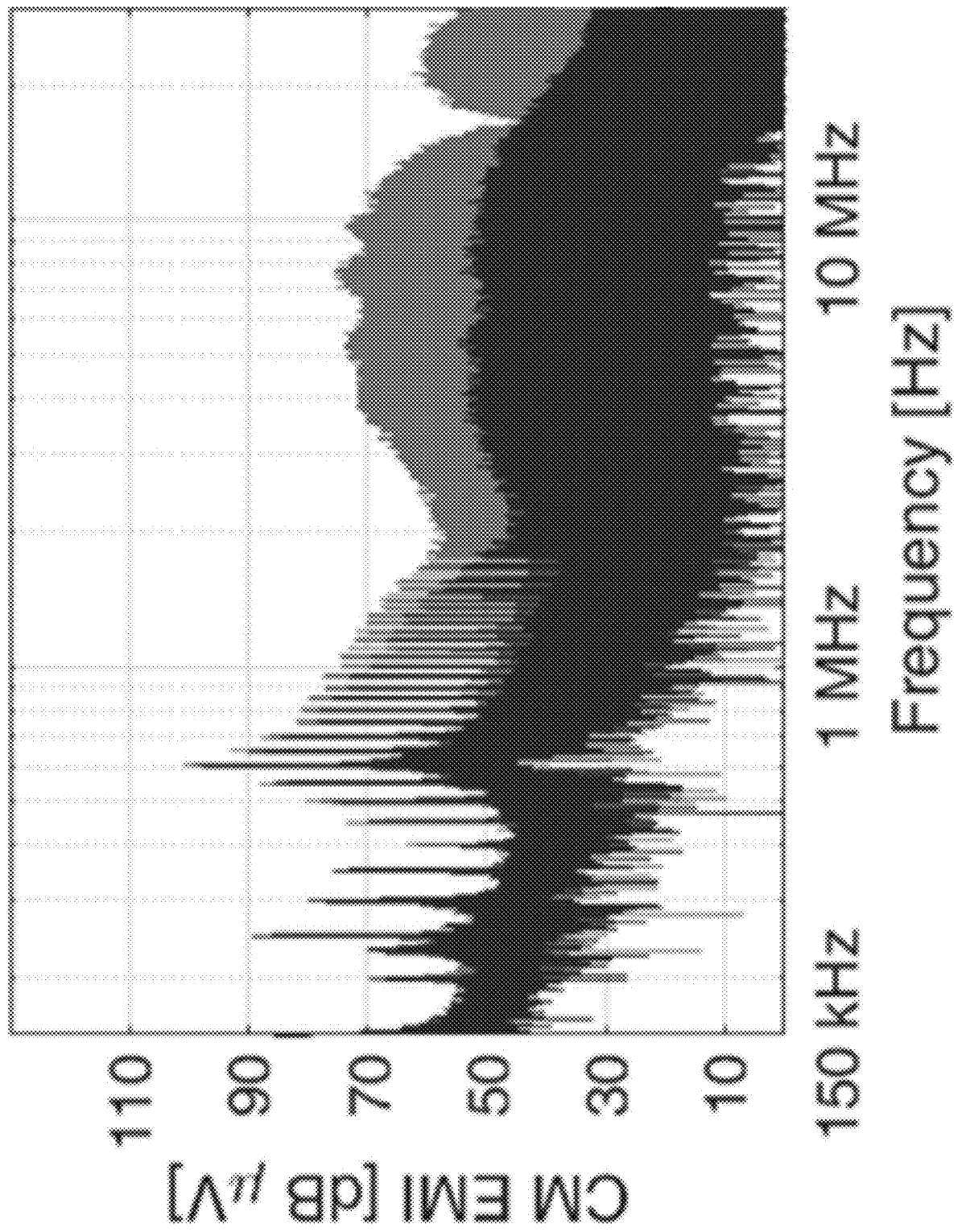
FIG. 10 shows a simulated CM EMI comparison between the current source inverter of FIG. 1 with no delay between switching events and with 60 nanoseconds delay between switching events in accordance with an illustrative embodiment.

Propagational delay distortion is unavoidable in practical power electronics circuits resulting in switching events in the upper and lower rows of each inverter leg of CSI 100 that occur at different times that those shown in FIGS. 6A-6F. For example, gate driver chip delay differences may occur for PWM signal generator 206 of different switches. There also may be delay differences from controller 402. There further may be differences in the turn on and turn off time of each switch. As a result, 10s to 100s of nanosecond differences may result in the switch timing relative to that shown in FIGS. 6A-6F. Usually, for power electronics with higher power levels, the propagational delay distortion is higher. Referring to FIG. 10, a simulated CM EMI comparison is shown for first CSI 100 with no delay between switching events as shown in FIG. 9 and with 60 nanoseconds delay between switching events. The 60 nanosecond delay was implemented between the switching of third switch 144, sixth switch 154, and ninth switch 164 and first switch 140, fourth switch 150, and seventh switch 160. The first CSI 100 CM EMI with no delay is shown in blue, and the first CSI 100 CM EMI with 60 nanoseconds delay is shown in red. The CM EMI benefits have been decreased significantly especially at higher frequency regions. For a lower power level CSI (such as from several watts to several hundred watts), the propagational delay distortion will be much lower than 60 nanoseconds. For these low-power applications, first CSI 100 provides significant CM EMI reduction throughout the frequency regions.

Figure 11:
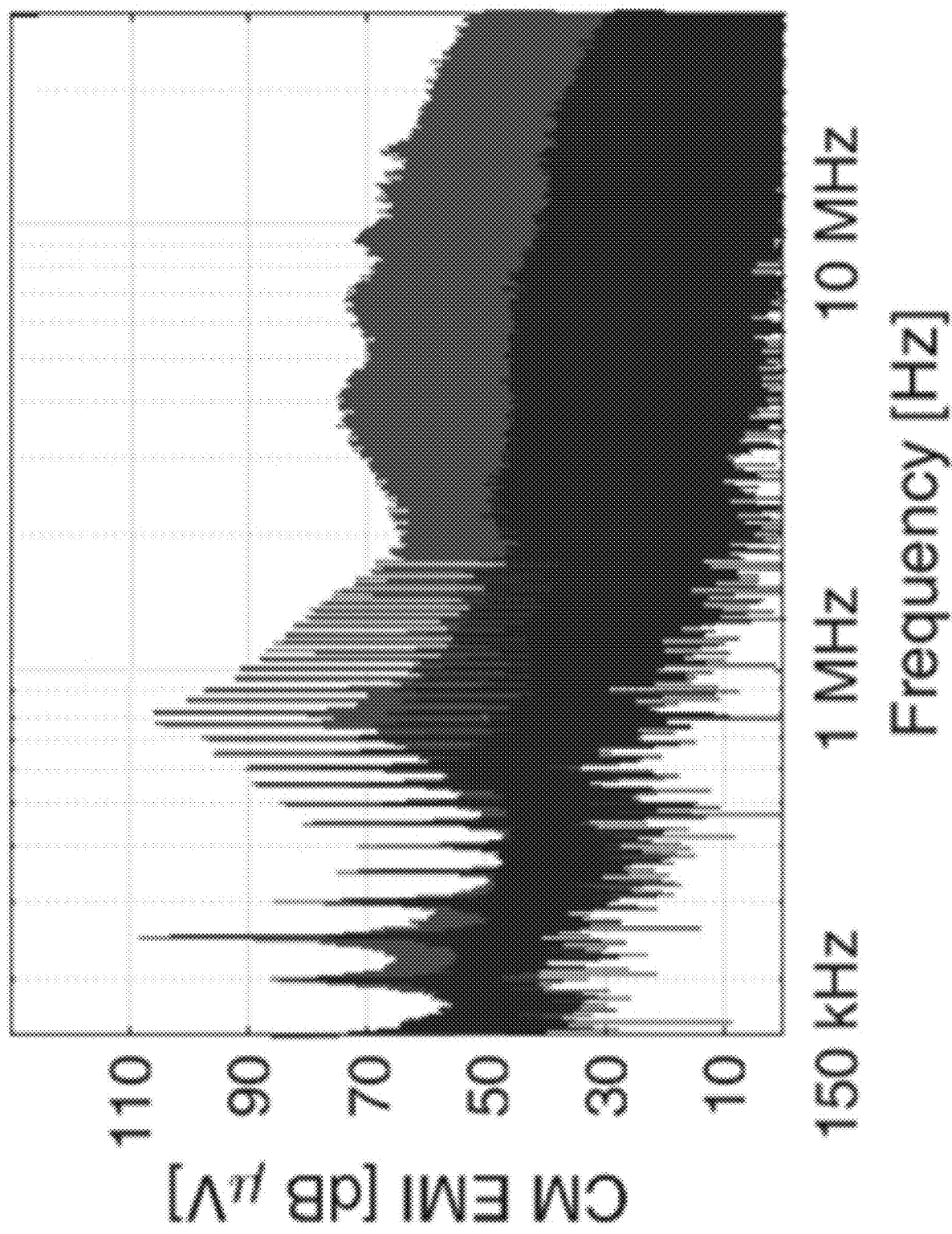
FIG. 11 shows a simulated CM EMI comparison between the current source inverter of FIG. 3 and the conventional H6-CSI in accordance with an illustrative embodiment.

Referring to FIG. 11, a simulated CM EMI comparison is shown between second CSI 300 and H6-CSI in accordance with an illustrative embodiment. The H6-CSI CM EMI is shown in red, and the second CSI 300 CM EMI is shown in blue. The CM EMI that results using second CSI 300 is as high as 35 dBµV (~750 kilohertz), which corresponds to 56 times lower when compared to H6-CSI. The reduction was consistently better than 20 dBµV.

Figure 12:
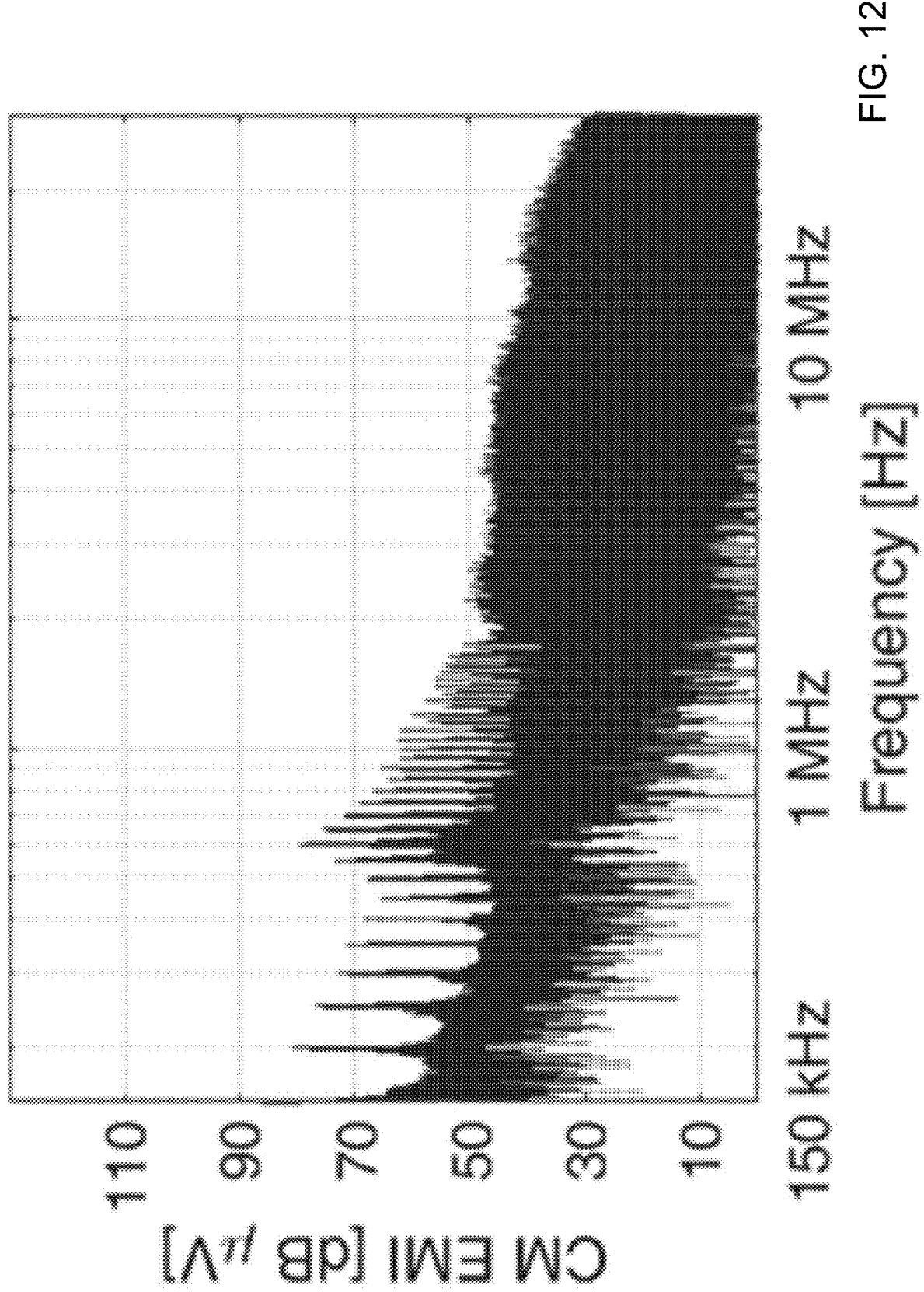
FIG. 12 shows a simulated CM EMI comparison between the current source inverter of FIG. 3 with no delay between switching events and with 60 nanoseconds delay between switching events in accordance with an illustrative embodiment.

Referring to FIG. 12, a simulated CM EMI comparison is shown for second CSI 300 with no delay between switching events and with 60 nanoseconds delay between switching events in accordance with an illustrative embodiment. The second CSI 300 CM EMI with no delay is shown in blue, and the second CSI 300 CM EMI with 60 nanoseconds delay is shown in red. The CM EMI benefits are essentially the same meaning second CSI 300 is not sensitive to propagational delays as a result of inclusion of tenth switch 302. Second CSI 300 further provides a higher efficiency and a higher fault tolerance through inclusion of tenth switch 302 because tenth switch 302 provides another current path for DC-link inductor 104 when the gate signals to inverter switching circuit 102 are all off.

Figure 13:
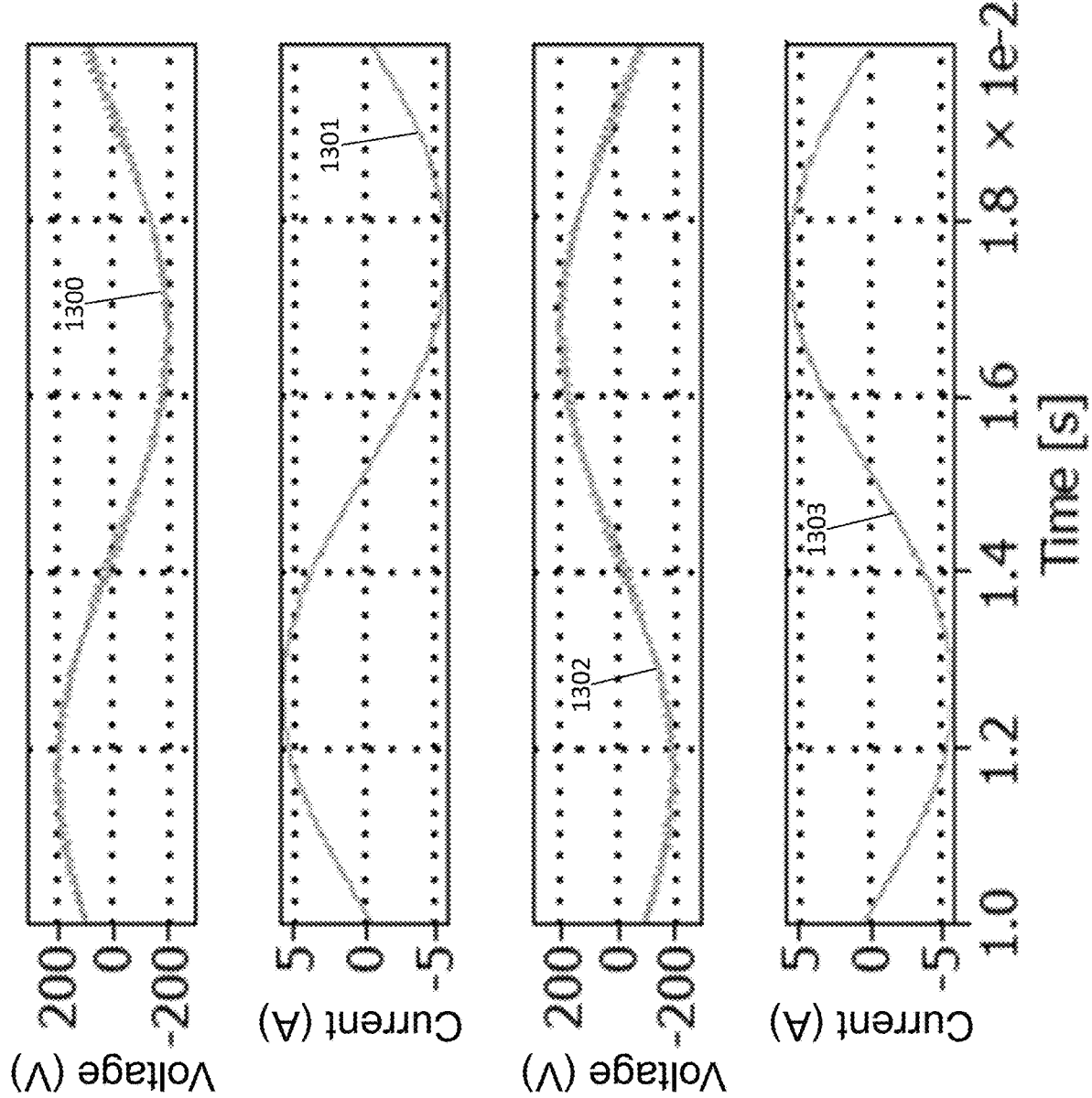
FIG. 13 shows a simulated voltage between two pairs of windings and a current in two different windings generated by the current source inverter of FIG. 3 in accordance with an illustrative embodiment.

Referring to FIG. 13, a simulated voltage between two pairs of windings and a current in two different windings generated by either first CSI 100 or second CSI 300 is shown in accordance with an illustrative embodiment. A first voltage curve 1300 shows the voltage $V_{1,A}$. A second voltage curve 1302 shows the voltage $V_{2,A}$. $V_{1,A}$ and $V_{2,A}$ are sinusoidal and 180 degrees out of phase with each other as expected. A first current curve 1301 shows the current $I_{1,A}$ on first, A phase line 146. A second current curve 1303 shows the current $I_{2,A}$ on second, A phase line 148. $I_{1,A}$ and $I_{2,A}$ are sinusoidal and 180 degrees out of phase with each other as expected.

Figure 15A:
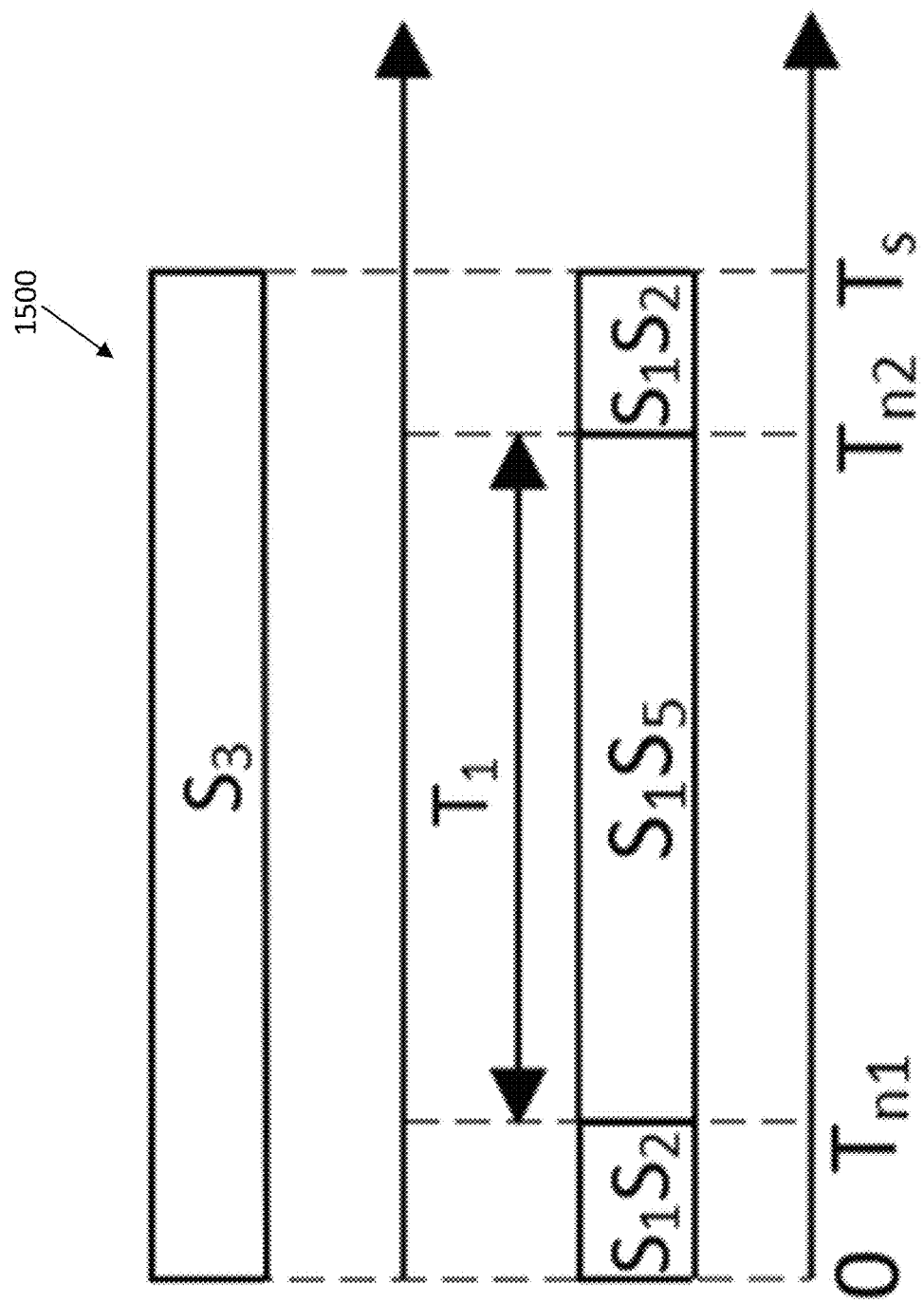
FIGS. 15A and 15B are control signal time period snapshots for the current source inverter of FIG. 14 when providing power to an AC load in accordance with an illustrative embodiment.
Figure 15B:
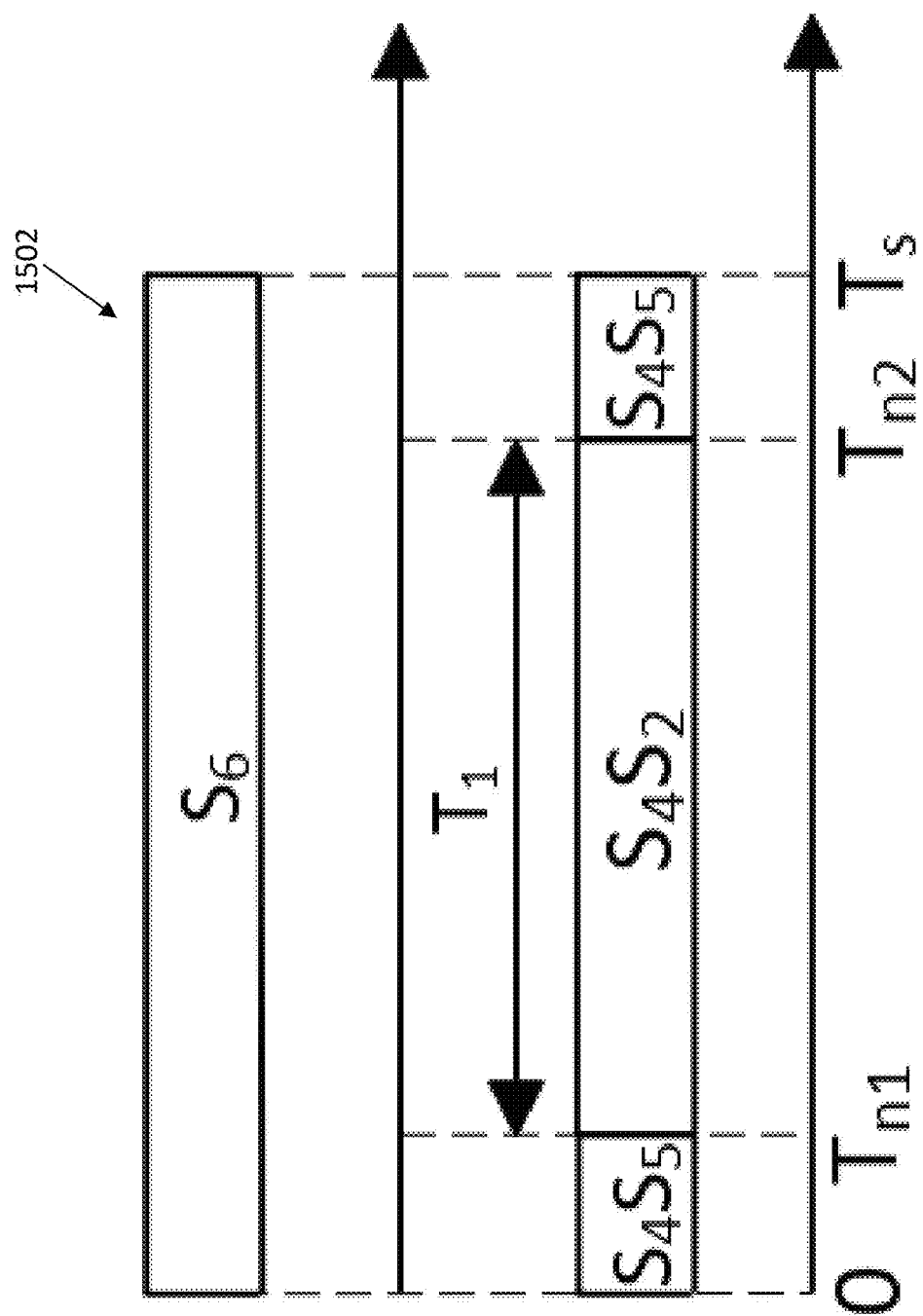

Inverter switching circuit 102 of either first CSI 100 or second CSI 300 may be modified to support a greater or a fewer number of phases of the output signal. For example, referring to FIG. 14, third current source inverter (CSI) 1400 is shown in accordance with an illustrative embodiment. Third CSI 1400 may include a second inverter switching circuit 1402, inductor 104, a third capacitive filter 1420, and a fourth capacitive filter 1422. Second inverter switching circuit 1402 is connected between inductor 104 and both third capacitive filter 1420 and fourth capacitive filter 1422. Third CSI 1400 is connected between DC source 112 and AC load 404 such as a motor C 118c and a motor D 118d. Control application 414 implements a control algorithm that operates third CSI 1400 from sector I to sector II as summarized in FIGS. 15A-15B respectively, and back to sector I in a continuous loop to continually respond to DC source 112 and/or AC load 404. FIG. 15A represents sector I. FIG. 15B represents sector II. Third CSI 1400 converts the DC current from DC source 112 to a single-phase AC voltage and current provided to each of motor C 118c and motor D 118d.

Second inverter switching circuit 1402 may include first inverter leg 106 and second inverter leg 108. Third capacitive filter 1420 may include first capacitor 124 and second capacitor 126. Fourth capacitive filter 1422 may include fourth capacitor 132 and fifth capacitor 134.

Referring to FIGS. 15A and 15B, $S_1$ indicates the on-state for first switch 140, $S_2$ indicates the on-state for second switch 142, $S_3$ indicates the on-state for third switch 144, $S_4$ indicates the on-state for fourth switch 150, $S_5$ indicates the on-state for fifth switch 152, and $S_6$ indicates the on-state for sixth switch 154. The pulses indicate when the respective RB switches are turned on. The non-designated switches in each sector are in the off-state unless shown in a pulse. Control application 414 implements a control algorithm that operates third CSI 1400 from sector I to sector II as summarized in FIGS. 15A and 15B respectively, and back to sector I in a continuous loop to continually respond to DC source 112 and/or AC load 404. FIG. 15A represents sector I. FIG. 15B represents sector II. Though not shown, all of the on-state signals of third CSI 1400 pass through a turn-off delay logic to implement an overlap time as understood by a person of skill in the art.

Referring to FIG. 15A, a sector I pulse sequence 1500 is shown in accordance with an illustrative embodiment. Third switch 144 is in the on-state from a start of the switching interval indicated as "0" to an end of the switching period designated as $T_s$ to show a single switching period. First switch 140 and second switch 142 are in the on-state from the start of the switching interval to a time designated as $T_{n1}$; first switch 140 and fifth switch 152 are in the on-state from the time designated as $T_{n1}$ to a time designated as $T_{n2}$; and first switch 140 and second switch 142 are in the on-state from the time designated as $T_{n2}$ to the end of the switching period, where $$T_1 = m_a T_s \sin(\theta)$$

for $$0 \leq \theta < \pi, T_0 = T_s - T_1, T_{n1} = \frac{T_0}{2}, T_{n2} = T_s - \frac{T_0}{2}.$$

Referring to FIG. 15B, a sector II pulse sequence 1502 is shown in accordance with an illustrative embodiment. Sixth switch 154 is in the on-state from the start of the switching interval to the end of the switching period. Fourth switch 150 and fifth switch 152 are in the on-state from the start of the switching interval to a time designated as $T_{n1}$; fourth switch 150 and second switch 142 are in the on-state from the time designated as $T_{n1}$ to a time designated as $T_{n2}$; and fourth switch 150 and fifth switch 152 are in the on-state from the time designated as $T_{n2}$ to the end of the switching period, where $$T_1 = m_a T_s \sin(\theta - \pi)$$

for $$\pi \leq \theta < 2\pi, T_0 = T_s - T_1, T_{n1} = \frac{T_0}{2}, T_{n2} = T_s - \frac{T_0}{2}.$$

Figure 16:
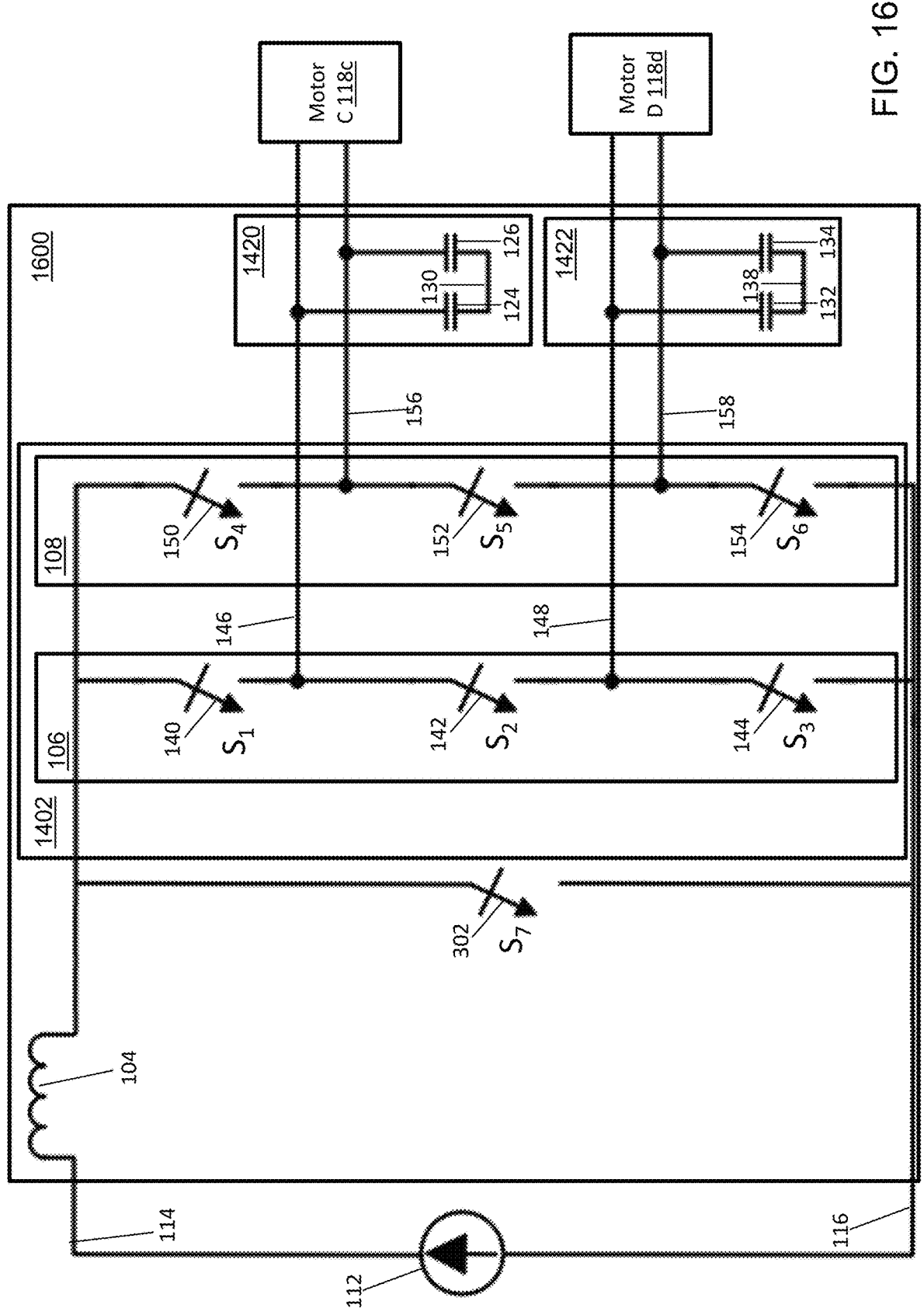
FIG. 16 is a circuit diagram of a balanced current source inverter in accordance with another illustrative embodiment.

As another example, referring to FIG. 16, fourth CSI 1600 is shown in accordance with an illustrative embodiment. Fourth CSI 1600 may include second inverter switching circuit 1402, tenth RB switch 302, inductor 104, third capacitive filter 1420, and fourth capacitive filter 1422. Tenth RB switch 302 is connected between inductor 104 and second inverter switching circuit 1402 in parallel with second inverter switching circuit 1402 between first bus line 114 and second bus line 116. Tenth RB switch 302 is connected on the side of inductor 104 opposite the connection with DC source 112. Fourth CSI 1600 converts the DC current from DC source 112 to a single-phase AC voltage and current provided to each of motor C 118c and motor D 118d.

Figure 17A:
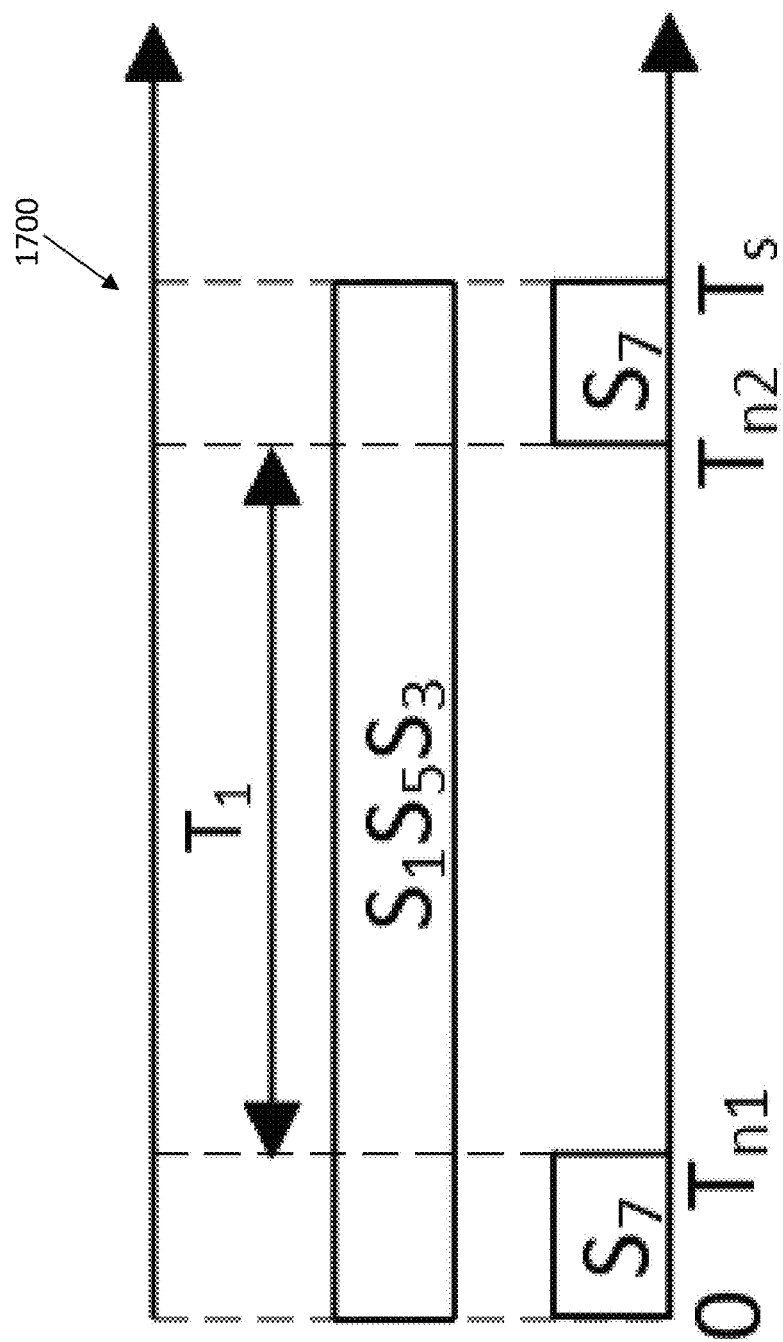
FIGS. 17A and 17B are control signal time period snapshots for the current source inverter of FIG. 16 when providing power to the AC load in accordance with an illustrative embodiment.
Figure 17B:
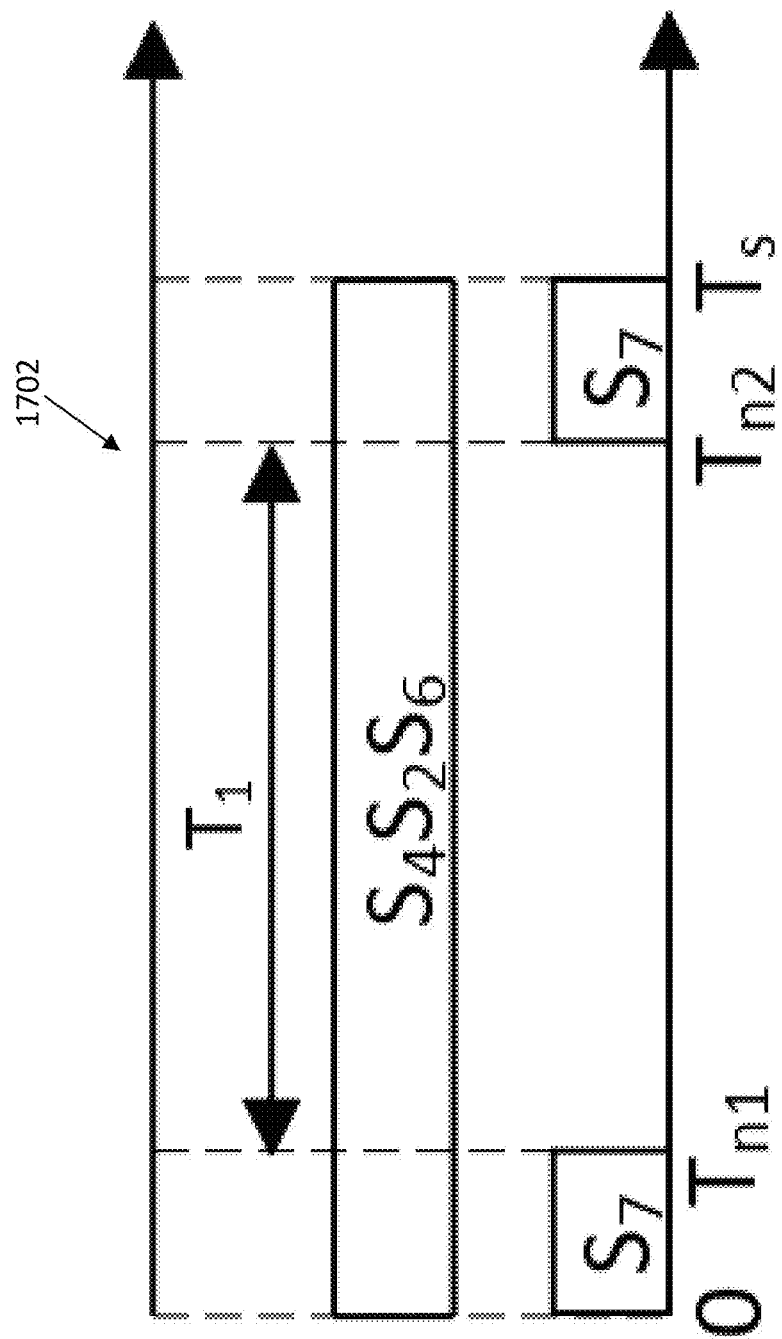

Referring to FIGS. 17A and 17B, $S_1$ indicates the on-state for first switch 140, $S_2$ indicates the on-state for second switch 142, $S_3$ indicates the on-state for third switch 144, $S_4$ indicates the on-state for fourth switch 150, $S_5$ indicates the on-state for fifth switch 152, $S_6$ indicates the on-state for sixth switch 154, and $S_7$ indicates the on-state for tenth switch 302. The pulses indicate when the respective RB switches are turned on. The non-designated switches in each sector are in the off-state unless shown in a pulse. Control application 414 implements a control algorithm that operates fourth CSI 1600 from sector I to sector II as summarized in FIGS. 17A and 17B respectively, and back to sector I in a continuous loop to continually respond to DC source 112 and/or AC load 404. FIG. 17A represents sector I. FIG. 17B represents sector II.

Referring to FIG. 17A, a sector I pulse sequence 1700 is shown in accordance with an illustrative embodiment. First switch 140, fifth switch 152, and third switch 144 are in the on-state from a start of the switching interval indicated as "0" to an end of the switching period designated as $T_s$ to show a single switching period. Tenth switch 302 is in the on-state from the start of the switching interval to a time designated as $T_{n1}$, and tenth switch 302 is in the on-state from the time designated as $T_{n2}$ to the end of the switching period, where $$T_1 - m_a T_s \sin(\theta)$$

for $$0 \leq \theta < \pi, T_0 = T_s - T_1, T_{n1} = \frac{T_0}{2}, T_{n2} = T_s - \frac{T_0}{2}.$$

Referring to FIG. 17B, a sector II pulse sequence 1702 is shown in accordance with an illustrative embodiment. Fourth switch 150, second switch 142, and sixth switch 154 are in the on-state from a start of the switching interval indicated as "0" to an end of the switching period designated as $T_s$ to show a single switching period. Tenth switch 302 is in the on-state from the start of the switching interval to a time designated as $T_{n1}$, and tenth switch 302 is in the on-state from the $$T_1 = m_a T_s \sin(\theta - \pi)$$

for $$\pi \le \theta < 2\pi, T_0 = T_s - T_1, T_{n1} = \frac{T_0}{2}, T_{n2} = T_s - \frac{T_0}{2}.$$

As another example, as understood by a person of skill in the art, when inverter switching circuit 102 provides N phases instead of the three phases provided in the illustrative embodiment, inverter switching circuit 102 includes N inverter legs, and first capacitive filter 120 includes N capacitors to provide a first N phase output to motor A 118a, and second capacitive filter 122 includes N capacitors to provide a second N phase output to motor B 118b.

A DC-link current ripple can be reduced resulting in a smaller inductance for inductor 104. For the same output power, the DC-link current amplitude can be reduced by 50% because the voltage has been doubled again resulting in a smaller inductance for inductor 104 and a lighter inductor 104, which is particularly beneficial in aerospace applications. A smaller inductance for inductor 104 also results in a higher power density.

Tenth switch 302 transiently shorts the DC-link's positive terminal directly to its negative terminal thereby shifting the responsibility for implementing the inverter zero states to the switching operation of tenth switch 302 making zero-current switching possible even in the presence of propagational switching delays. In addition, for any of first CSI 100, second CSI 300, third CSI 1400, and fourth CSI 1600, the use of the third row of switches generates a second common-mode voltage (CMV) component that forces the total CMV of any of first CSI 100, second CSI 300, third CSI 1400, and fourth CSI 1600 to be close to zero. This suppression of the total CMV produced by the balanced first CSI 100, second CSI 300, third CSI 1400, and fourth CSI 1600 significantly reduces the conducted CM EMI.

The balanced first CSI 100, second CSI 300, third CSI 1400, and fourth CSI 1600 provide benefits relative to a balanced voltage-source inverter (VSI) topology. First, first CSI 100, second CSI 300, third CSI 1400, and fourth CSI 1600 can use a rugged and high-temperature capable DC-link inductor (inductor 104), while the balanced VSI uses a more fragile and temperature-limited DC-link capacitor. Second, the output voltages of both balanced CSI topologies are sinusoidal, while the balanced VSI topology delivers output voltage waveforms that consist of voltage pulses with high-dv/dt wavefronts. Third, the balanced first CSI 100, second CSI 300, third CSI 1400, and fourth CSI 1600 use reverse-voltage-blocking (RB) switches, while the balanced VSI uses standard switches that replace the RVB capability with reverse-current conduction capability. Fourth, inclusion of tenth switch 302 introduced across the DC-link in second CSI 300 and in fourth CSI 1600 is not possible in the balanced VSI because it would directly short-circuit the DC-link capacitor, creating a dangerous fault condition.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A switching circuit for a current source inverter comprising:
   a first inverter leg comprising
      a first reverse-voltage-blocking (RB) switch;
      a second RB switch; and
      a third RB switch, wherein the first RB switch, the second RB switch, and the third RB switch are connected in series between a first bus line and a second bus line;
   a second inverter leg comprising
      a fourth RB switch;
      a fifth RB switch; and
      a sixth RB switch, wherein the fourth RB switch, the fifth RB switch, and the sixth RB switch are connected in series between the first bus line and the second bus line; and
   a controller configured to control a switch between an on-state and an off-state for each RB switch;
   wherein, when in the on-state, a reverse voltage is blocked by a respective RB switch, and a current with a positive polarity is conducted through the respective RB switch;
   wherein, when in the off-state, a voltage and the current are blocked by the respective RB switch.

2. The switching circuit of claim 1, wherein each RB switch comprises:
   a semiconductor switch comprising
      a first terminal;
      a second terminal; and
      a third terminal, wherein, when the on-state signal is sent to the first terminal, a first current is conducted from the second terminal to the third terminal; and
   a diode, wherein an anode of the diode is connected to the third terminal.

3. The switching circuit of claim 1, further comprising:
   a seventh RB switch connected between the first bus line and the second bus line,
   wherein the controller is further configured to switch the seventh RB switch between the on-state and the off-state.

4. The switching circuit of claim 3, wherein the seventh RB switch is controlled to enter the on-state for a predefined time period at a beginning of a switching period, wherein the seventh RB switch is controlled to enter the on-state for the predefined time period before an end of the switching period.

5. The switching circuit of claim 4, wherein either the first RB switch, the third RB switch, and the fifth RB switch or the second RB switch, the fourth RB switch, and the sixth RB switch are controlled to enter the on-state from the beginning of the switching period to the end of the switching period based on an angle of a space vector.

6. The switching circuit of claim 1, further comprising:
a third inverter leg comprising
a seventh RB switch;
an eighth RB switch; and
a ninth RB switch, wherein the seventh RB switch, the eighth RB switch, and the ninth RB switch are connected in series between the first bus line and the second bus line;
wherein the controller is further configured to switch the seventh RB switch, the eighth RB switch, and the ninth RB switch between the on-state and the off-state.

7. The switching circuit of claim 6, wherein the controller selects a first switching state for the first inverter leg from a set of four switching states, wherein the set includes only four switching states, a second switching state for the second inverter leg from the set of four switching states, and a third switching state for the third inverter leg from the set of four switching states, wherein each selected switching state is unique relative to other selected switching states.

8. The switching circuit of claim 7, wherein a first selectable switching state of the set of four switching states indicates that, unless all of the RB switches are controlled in the off-state, when the second RB switch is controlled in the off-state, the first RB switch and the third RB switch are in the on-state, or when the fifth RB switch is controlled in the off-state, the fourth RB switch and the sixth RB switch are in the on-state, or when the eighth RB switch is controlled in the off-state, the seventh RB switch and the ninth RB switch are in the on-state.

9. The switching circuit of claim 8, wherein a second selectable switching state of the set of four switching states indicates that, when the second RB switch is controlled in the on-state, the first RB switch and the third RB switch are in the off-state, or when the fifth RB switch is controlled in the on-state, the fourth RB switch and the sixth RB switch are in the off-state, or when the eighth RB switch is controlled in the on-state, the seventh RB switch and the ninth RB switch are in the off-state.

10. The switching circuit of claim 9, wherein a third selectable switching state of the set of four switching states indicates that the first RB switch, the second RB switch, the third RB switch, the fourth RB switch, the fifth RB switch, the sixth RB switch, the seventh RB switch, the eighth RB switch and the ninth RB switch are controlled to be simultaneously in the off-state.

11. The switching circuit of claim 10, wherein a fourth selectable switching state of the set of four switching states indicates that the first RB switch, the second RB switch, the third RB switch, the fourth RB switch, the fifth RB switch, the sixth RB switch, the seventh RB switch, the eighth RB switch and the ninth RB switch are controlled to be simultaneously in the on-state,
wherein, when one of the first inverter leg, the second inverter leg, or the third inverter leg is controlled to be in the fourth selectable switching state, a remaining pair of the first inverter leg, the second inverter leg, and the third inverter leg is controlled to be simultaneously in the off-state.

12. The switching circuit of claim 11, wherein, when any RB switch transitions from the on-state to the off-state or from the off-state to the on-state, the first RB switch, the second RB switch, the third RB switch, the fourth RB switch, the fifth RB switch, the sixth RB switch, the seventh RB switch, the eighth RB switch and the ninth RB switch are controlled to be simultaneously in the off-state for a predefined time period.

13. The switching circuit of claim 6, further comprising:
a tenth RB switch connected between the first bus line and the second bus line,
wherein the controller is further configured to switch the tenth RB switch between the on-state and the off-state.

14. The switching circuit of claim 13, wherein the controller selects a first switching state for the first inverter leg from a set of three switching states, wherein the set includes only three switching states, a second switching state for the second inverter leg from the set of three switching states and a third switching state for the third inverter leg from the set of three switching states, wherein each selected switching state is unique relative to other selected switching states.

15. The switching circuit of claim 14, wherein a first selectable switching state of the set of three switching states indicates that, unless all of the RB switches are controlled in the off-state, when the second RB switch is controlled in the off-state, the first RB switch and the third RB switch are in the on-state, or when the fifth RB switch is controlled in the off-state, the fourth RB switch and the sixth RB switch are in the on-state, or when the eighth RB switch is controlled in the off-state, the seventh RB switch and the ninth RB switch are in the on-state.

16. The switching circuit of claim 15, wherein a second selectable switching state of the set of three switching states indicates that, when the second RB switch is controlled in the on-state, the first RB switch and the third RB switch are in the off-state, or when the fifth RB switch is controlled in the on-state, the fourth RB switch and the sixth RB switch are in the off-state, or when the eighth RB switch is controlled in the on-state, the seventh RB switch and the ninth RB switch are in the off-state.

17. The switching circuit of claim 16, wherein a third selectable switching state of the set of three switching states indicates that the first RB switch, the second RB switch, the third RB switch, the fourth RB switch, the fifth RB switch, the sixth RB switch, the seventh RB switch, the eighth RB switch and the ninth RB switch are controlled to be simultaneously in the off-state.

18. The switching circuit of claim 13, wherein the tenth RB switch is controlled to enter the on-state for a predefined time period, wherein the predefined time period occurs before and after a transition from the on-state to the off-state of any RB switch.

19. The switching circuit of claim 18, wherein the predefined time period is one-fourth of a space vector zero state's dwell time in a predefined inverter switching period.

20. A current source inverter comprising:
an inductor;
a first filter;
a second filter;
a switching circuit connected between the inductor and the first filter and between the inductor and the second filter, the switching circuit comprising
a first inverter leg comprising
a first reverse-voltage-blocking (RB) switch;
a second RB switch; and
a third RB switch, wherein the first RB switch, the second RB switch, and the third RB switch are connected in series between a first bus line and a second bus line; and
a second inverter leg comprising
a fourth RB switch;
a fifth RB switch; and a sixth RB switch, wherein the fourth RB switch, the fifth RB switch, and the sixth RB switch are connected in series between the first bus line and the second bus line; and a controller configured to control a switch between an on-state and an off-state for each RB switch;

wherein, when in the on-state, a reverse voltage is blocked by a respective RB switch, and a current with a positive polarity is conducted through the respective RB switch, wherein, when in the off-state, a voltage and the current are blocked by the respective RB switch, wherein the first filter is configured to be connected between the switching circuit and a first load, wherein the second filter is configured to be connected between the switching circuit and a second load.

\* \* \* \* \*

UNITED STATES PATENT AND TRADEMARK OFFICE
CERTIFICATE OF CORRECTION

PATENT NO. : 11,575,329 B1  
APPLICATION NO. : 17/463676  
DATED : February 7, 2023  
INVENTOR(S) : Thomas Merlin Jahns et al.

Page 1 of 1

It is certified that error appears in the above-identified patent and that said Letters Patent is hereby corrected as shown below:

In the Specification

Column 20, Line 67:
After the phrase "on-state from the", please add the phrase "start of the switching interval to a time designated as $T_{n1}$, and tenth switch 302 is in the on-state from the time designated as $T_{n2}$ to the end of the switching period, where".

Signed and Sealed this  
Thirteenth Day of June, 2023

Katherine Kelly Vidal  
*Director of the United States Patent and Trademark Office*